US012762729B2

(12) United States Patent
Sokolova et al.

(10) Patent No.: US 12,762,729 B2
(45) Date of Patent: Oct. 13, 2026

(54) FLOORPLAN-AWARE CAMERA POSE REFINEMENT METHOD AND SYSTEM

(71) Applicant: SAMSUNG ELECTRONICS CO., LTD., Suwon-si (KR)

(72) Inventors: Anna Ilyinichna Sokolova, Moscow (RU); Alexander Georgievich Limonov, Moscow (RU); Filipp Alexandrovich Nikitin, Ivanovo region (RU); Anton Sergeevich Konushin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 18/818,324

(22) Filed: Aug. 28, 2024

(65) Prior Publication Data

US 2024/0420363 A1 Dec. 19, 2024

Related U.S. Application Data

(63) Continuation of application No. PCT/KR2023/002523, filed on Feb. 22, 2023.

(30) Foreign Application Priority Data

Feb. 28, 2022 (RU) ................................ 2022105229
May 27, 2022 (RU) ................................ 2022114386

(51) Int. Cl.
*G06T 7/70* (2017.01)

(52) U.S. Cl.
CPC ...................................... *G06T 7/70* (2017.01)

(58) Field of Classification Search
CPC ............. G06T 7/70; G06T 2207/10016; G06T 2207/10028; G06T 2207/30241; G06T 2207/30244; G06T 7/75; G06T 17/10
See application file for complete search history.

(56) References Cited

U.S. PATENT DOCUMENTS 11,200,734 B2 12/2021 Huang et al.
2019/0005711 A1 1/2019 Marin et al.
(Continued)

FOREIGN PATENT DOCUMENTS

RU 2 759 773 C1 11/2021
RU 2 759 965 C1 11/2021
(Continued)

OTHER PUBLICATIONS

Communication dated Feb. 26, 2025 issued by the European Patent Office in European Patent Application No. 23760374.1.
(Continued)

*Primary Examiner* — Andrew W Bee
*Assistant Examiner* — Rebecca Colette Williams
(74) *Attorney, Agent, or Firm* — Sughrue Mion, PLLC

(57) ABSTRACT

A method includes receiving a floorplan of a three-dimensional (3D) structure of a scene; receiving one or more imaging scans of the scene; identifying a gravity direction for the one or more imaging scans; generating, based on the gravity direction, a boundary scan by filtering out one or more points in the one or more imaging scans having horizontal projections that deviate from other points in the one or more imaging scans by a predetermined amount; aligning the boundary scan with the floorplan; extracting one or more structural elements in the one or more imaging scans; and optimizing a three-term cost function comprising a geometric term, a floor term and, a walls term by correlating points in the one or more imaging scans corresponding to the structural elements to respective points in the floorplan.

20 Claims, 11 Drawing Sheets

(56) References Cited

U.S. PATENT DOCUMENTS

| | | | |
|---|---|---|---|
| 2020/0111251 | A1 | 4/2020 | Shi et al. |
| 2021/0142497 | A1 | 5/2021 | Pugh |
| 2021/0279950 | A1 | 9/2021 | Phalak |
| 2021/0279957 | A1 | 9/2021 | Eder et al. |

FOREIGN PATENT DOCUMENTS

| | | | |
|---|---|---|---|
| WO | 2015/048434 | A1 | 4/2015 |
| WO | 2018/201019 | A1 | 11/2018 |

OTHER PUBLICATIONS

Erik Wijmans et al., "Exploiting 2D Floorplan for Building-scale Panorama RGBD Alignment", Arxiv.org, Cornell University Library, 201 Olin Library Cornell University Ithaca, NY 14853, arXiv:1612.02859v1 [cs.CV] Dec. 8, 2016, XP080737992, DOI: 10.1109/CVPR.2017.156 (10 pages total).
Cheng Lin et al., "Floorplan Priors for Joint Camera Pose and Room Layout Estimation", Arxiv.org, Cornell University Library, 201 Olin Library Cornell University Ithaca, NY 14853, arXiv:1812.06677v1 [cs.CV] Dec. 17, 2018, XP080993748 (10 pages total).
Ismail Rusli et al., "RoomSLAM: Simultaneous Localization and Mapping With Objects and Indoor Layout Structure", IEEE Access, IEEE, USA, vol. 8, Oct. 28, 2020, XP011819064, DOI: 10.1109/ACCESS.2020.3034537, pp. 196992-197004 (13 pages total).
Communication dated Sep. 15, 2025 issued by the European Patent Office in European Patent Application No. 23760374.1.
Communication issued Feb. 14, 2023 by the Russian Patent Office in Russian Application No. 2022114386.
Atanasov et al., "A Unifying View Of Geometry, Semantics, And Data Association In Slam," In IJCAI, pages (5 total pages) 2018.
Choy, et al., "Deep Global Registration," arXiv:2004.11540v2, 11 total pages, 2020.
DeTone et al., "Super-Point: Self-Supervised Interest Point Detection And Description," 13 total pages, arXiv:1712.07629v4, 2018.
Frost et al., "Object-Aware Bundle Adjustment For Correcting Monocular Scale Drift," In 2016 IEEE International Conference on Robotics and Automation (ICRA), (7 total pages), IEEE, 2016.
Dgalvez-Lopez et al., "Real-time monocular object SLAM," Robotics and Autonomous Systems, (16 total pages), arXiv:1504.02398v1, 2015.
Hess-Flores et al., "Ray Divergence-Based Bundle Adjustment Conditioning For Multi-View Stereo," 12 total pages 2011.
Howard-Jenkins et al., "Lalaloc: Latent Layout Localisation In Dynamic, Unvisited Environments" In Proceedings of the IEEE/CVF International Conference on Computer Vision, 10 total pages 2021.
Hsiao et al., "Keyframe-Based Dense Planar Slam," In 2017 IEEE International Conference on Robotics and Automation (ICRA), 8 total pages, IEEE, 2017.
Kornilova et al., "Be Your Own Benchmark: No-Reference Trajectory Metric On Registered Point Clouds," arXiv:2106.11351v2, 8 total pages, 2021.
Ma et al., "CPA- SLAM: Consistent Plane-Model Alignment For Direct RGB-D Slam," In 2016 IEEE International Conference on Robotics and Automation (ICRA), 7 total pages. IEEE, 2016.
Melbouci et al., "Bundle adjustment revisited for slam with RGBD sensors," In 2015 14th IAPR International Conference on Machine Vision Applications (MVA), 4 total pages, IEEE, 2015.
Nicholson et al., "Quadric-Slam: Dual Quadrics From Object Detections As Landmarks In Object- Oriented Slam," IEEE Robotics and Automation Letters, 4(1):1-8, arXiv:1804.04011v3, 2018.
Park et al., "Colored Point Cloud Registration Revisited," In ICCV, 10 total pages, 2017.
Razlaw et al., "Evaluation Of Registration Methods For Sparse 3D Laser Scans," In 2015 European Conference on Mobile Robots (ECMR), 7 total pages, 2015.
Scherer et al., "Using Depth In Visual Simultaneous Localisation And Mapping," In 2012 IEEE International Conference on Robotics and Automation, 6 total pages. IEEE, 2012.
Scherer et al., "Efficient onbard RGBD-SLAM for Autonomous MAVs," In 2013 IEEE/RSJ International Conference on Intelligent Robots and Systems, 7 total pages, IEEE, 2013.
Schinstock et al., "An Alternative Cost Function To Bundle Adjustment Used for Aerial Photography From UAVs," 8 total pages, 2009.
Schops et al., "BAD SLAM: Bundle Adjusted Direct RGB-D SLAM," In Proceedings of the IEEE/CVF Conference on Computer Vision and Pattern Recognition (CVPR), 11 total pages, Jun. 2019.
Teed et al., "DROID-SLAM: Deep Visual SLAM for Monocular, Stereo, and RGB-D Cameras," Advances in neural information processing systems, arXiv:2108.10869v1, 2021.
Tulsiani et al., "Multi-view Supervision For Single-View Reconstruction via Differentiable Ray Consistency," In Proceedings of the IEEE conference on computer vision and pattern recognition, 9 total pages, 2017.
Wijmans et al., "Exploiting 2D Floorplan For Building-Scale Panorama RGBD Alignment," In Proceedings of the IEEE Conference on Computer Vision and Pattern Recognition, 9 total pages, 2017.
Zhang, PL-GM: RGB-D Slam With A Novel 2D And 3D Geometric Constraint Model Of Point And Line Features. IEEE Access, vol. 9, 14 total pages, 2021.

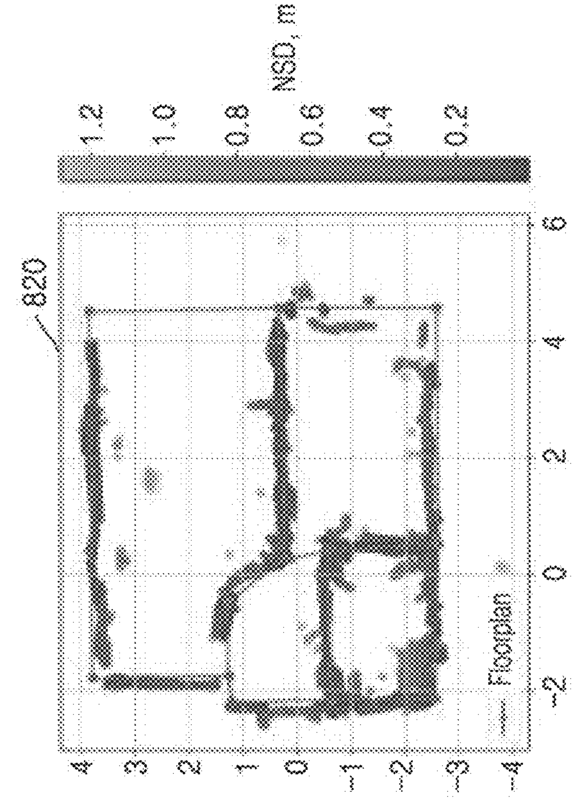
FIG. 8
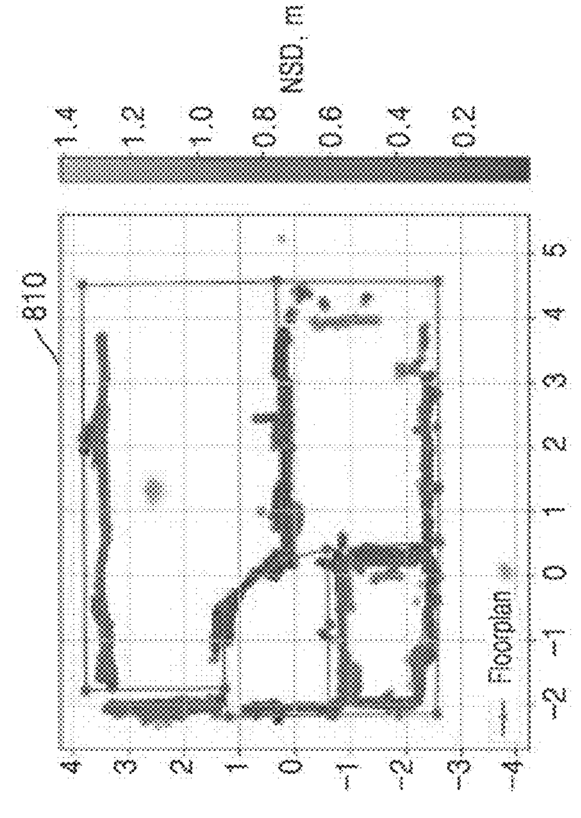

FLOORPLAN-AWARE CAMERA POSE REFINEMENT METHOD AND SYSTEM

CROSS-REFERENCE TO RELATED APPLICATIONS

This application is a continuation of PCT International Application No. PCT/KR2023/002523, which was filed on Feb. 22, 2023, and claims priority to Russian Patent Application No. 2022114386, filed on May 27, 2022, and claims priority to Russian Patent Application No. 2022105229, filed on Feb. 28, 2022, the disclosures of each of which are incorporated by reference herein their entirety.

BACKGROUND

1. Field

The disclosure generally relates to the field of computer vision, and more specifically to photogrammetric applications, object positioning systems, mobile and static 3D scanning systems for various indoor environments (apartments, offices, shops etc.).

2. Description of Related Art

With the present-day intense development of computer vision techniques, computers have become capable of automatically performing various tasks of three-dimensional (3D) modeling and/or mapping of real world object-containing spaces such as rooms, visual localization of objects in 3D scenes, visual analysis of scene contents etc.

Many such computer vision applications require capturing 3D scans of different indoor scenes, including large scenes containing more than one room and many walls and partitions. Such scenes cannot be captured at once due to the limits of the depth range of image capturing equipment and presence of overlaps caused by occupancies and walls. Thus, such scenes have to be captured by several scans. These scenes may be obtained by a continuously moving a sensor with some camera pose estimator inside (e.g. any SLAM model or Google ARCore) or by registration of several partial scans. To obtain precise information on object positions in such 3D scenes, it is very important to know precise camera pose (i.e. position and orientation) information for every given scan in a sequence of one or more scans obtained using such one or more cameras. Therefore, there is a need for refining (e.g., specifying) camera pose information and/or refining (estimating) camera trajectory, in particular, in such 3D indoor scene scan generation scenarios.

The related art provides a number of approaches to scan registration and camera trajectory estimation. However, in case of large scenes, all these approaches are error-prone and do not provide perfect scans. Small pose errors accumulate during scanning leading to bifurcation of walls and floors (e.g., the same walls and floors do not superimpose after a loop closure) and corruption of the geometry. Besides, the similar patterns and the absence of "significant" points (for example in case of large wall) lead to the mistakes in keypoint matching in the localization algorithms and scan corruption, as well.

Such scans need to be optimized for further use. Most of the scenes that have to be modeled usually have a floorplan constructed while building. Floorplans usually contain information about geometry and main structural features of the scene (walls, partitions, doors, etc.), but not about internal contents (e.g. furniture), and may be used as ground truth for model improvement. Aligning a scan reflecting the current state of the scene and a floorplan may not only help improve the scan, but also obtain the full scheme of the scene.

One of the approaches to the above-mentioned issue is based on bundle adjustment (BA) which refers to geometrical bundles of light rays originating from each 3D feature and converging on each camera's optical center, said bundles being optimally adjusted according to an optimality criterion involving respective image projections of all points.

Having a raw posed RGB-D sequence captured by at least one sensor and a ground truth floor plan with correct geometry, there may be a need for obtaining a new set of camera poses such that wall structure of the new scan obtained using this new set of camera poses is as close to the ground truth floorplan as possible.

3D reconstruction pipeline based on RGB-D sequence captured by sensors usually consists of a tracking module, which is applied to the RGB-D sequence, and global bundle adjustment (BA) optimization which takes the initial posed RGB-D sequence and corrects the poses so that said sequence becomes more consistent. In other words, a tracking module is configured for primary camera pose (e.g., position and orientation) estimation. Cameras, by means of which the positioning is performed are also referred to as tracking cameras. BA optimization is performed after said primary estimation.

However, while aiming at consistency, BA solves a loop closure problem, but does not ensure that geometry of all objects and scan parts are perfect. For example, planes may still get curved, corners get rounded, and the whole scan may be distorted.

BA aims at refining camera poses and 3D points to improve consistency between 3D points and their 2D projections onto images of a scene to be modeled. In standard BA formulation, cost function is based on reprojection errors. However, it is not defined universally, thus it exhibits singularities, which makes optimization process sensitive to initial conditions and outliers. In particular BA formulations such as described e.g. in Mauricio Hess-Flores, Daniel Knoblauch, Mark Duchaineau, Kenneth Joy, and Falko Kuester. Ray divergence-based bundle adjustment conditioning for multi-view stereo, pages 153-164, 11 2011., Dale Schinstock, Chris Lewis, and Craig Buckley. An alternative cost function to bundle adjustment used for aerial photography from uavs. 04 2009., cost function is based on minimum distance between light rays of two cameras pointing at the same feature. In other related art sources, depth may be incorporated into BA objective function (see e.g. Kathia Melbouci, Sylvie Naudet Collette, Vincent Gay-Bellile, Omar Ait-Aider, Mathieu Carrier, and Michel Dhome. Bundle adjustment revisited for slam with rgbd sensors. In 2015 14th IAPR International Conference on Machine Vision Applications (MVA), pages 166-169. IEEE, 2015., Sebastian A Scherer, Daniel Dube, and Andreas Zell. Using depth in visual simultaneous localisation and mapping. In 2012 IEEE International Conference on Robotics and Automation, pages 5216-5221. IEEE, 2012., Sebastian A Scherer and Andreas Zell. Efficient onbard rgbd-slam for autonomous mavs. In 2013 IEEE/RSJ International Conference on Intelligent Robots and Systems, pages 1062-1068. IEEE, 2013.).

For more complex scene models including point semantic labels, geometric primitives, or objects, there might be additional connections reflecting the structure of the scene. In some cases, additional constraints, such as coplanarity of certain points, should be taken into account in the optimization process. One of the greatest advantages of BA is its ability to adapt to almost arbitrary scene.

To enforce structural consistency in 3D space, a cost function that represents the 3D discrepancy of point estimates from two views is employed. Specifically, a distance between estimates of the same 3D point converted into a common coordinate system is penalized. Such loss may be generalized to multiple views. Incorporating depth data increases the robustness of BA and allows to handle difficult configurations without incurring the risks posed by a reprojection function.

Various ways to define geometric inconsistency are introduced in RGB-D simultaneous localization and mapping (SLAM) approaches. A bundle adjusted direct (BAD) SLAM (see e.g., Thomas Schops, Torsten Sattler, and Marc Pollefeys. Bad slam: Bundle adjusted direct rgb-d slam; proceedings of the IEEE/CVF Conference on Computer Vision and Pattern Recognition (CVPR), June 2019.) was the first dense BA approach for RGB-D SLAM, that combined geometric constraints based on the depth maps and photometric constraints within a cost function. In BAD SLAM, an optimization is applied to the scan represented in a form of surfels-oriented 3D disks supplied with scalar visual descriptors; the geometric term penalizes an angle between a surfel normal and the one transformed to the camera coordinates from a different frame. Consistent plane-model alignment (CPA)-SLAM (see e.g. Lingni Ma, Christian Kerl, Jorg Stuckler, and Daniel Cremers. Cpa-slam: Consistent plane-model alignment for direct rgb-d slam. In 2016 IEEE International Conference on Robotics and Automation (ICRA), pages 1285-1291. IEEE, 2016.) represents a scan with a global plane model and uses planes for tracking and global graph optimization; similar to surfels, the angles between plane normals are minimized. PL-GM (see e.g. Chenyang Zhang. Pl-gm: Rgb-d slam with a novel 2d and 3d geometric constraint model of point and line features. IEEE Access, 9:9958 9971, 2021.) incorporates absolute depth error in the cost function. KDP-SLAM (see e.g. Ming Hsiao, Eric Westman, Guofeng Zhang, and Michael Kaess. Keyframe-based dense planar slam. In 2017 IEEE International Conference on Robotics and Automation (ICRA), pages 5110-5117. IEEE, 2017.) exploits an iterative projected plane method to calculate the geometric error.

Other related art approaches employ, in particular, formalizing geometric inconsistency in terms of camera rays inconsistency. For instance, differentiable ray consistency (DRC, see e.g. Shubham Tulsiani, Tinghui Zhou, Alexei A Efros, and Jitendra Malik. Multi-view supervision for single-view reconstruction via differentiable ray consistency. In Proceedings of the IEEE conference on computer vision and pattern recognition, pages 2626-2634, 2017.), may be used as an objective function when performing single-view reconstruction.

SLAM systems leverage semantic information in various ways: from penalizing mismatched semantic labels in point reprojection to more inventive object-based approaches. For instance, Frost et. al. (see Duncan P Frost, Olaf Kahler, and David W Murray. Object-aware bundle adjustment for correcting monocular scale drift. In 2016 IEEE International Conference on Robotics and Automation (ICRA), pages 4770-4776. IEEE, 2016.) adds an extra term based on the size of detected objects to a BA cost function and proves it to prevent a scale drift over a long outdoor trajectory. Galvez-Lopez et al. (see Dorian Galvez-Lopez, Marta Salas, Juan D Tardos, and JMM Montiel. Real-time monocular object slam. Robotics and Autonomous Systems, 75:435-449, 2016.) collects an object database and utilizes object 3D models to estimate the scale of the environment. Atanasov et al. (see Pappas. A unifying view of geometry, semantics, and data association in slam. In IJCAI, pages 5204-5208, 2018.) establishes probabilistic associations between objects and incorporates them into an optimization process. Nicholson et al. (see Lachlan Nicholson, Michael Milford, and Niko Siinderhauf. Quadric-slam: Dual quadrics from object detections as landmarks in object-oriented slam. IEEE Robotics and Automation Letters, 4(1):1-8, 2018.) exploits dual quadrics to capture the shape and pose of an object.

Howard et. al. (see Henry Howard-Jenkins, Jose-Raul Ruiz-Sarmiento, and Victor Adrian Prisacariu. Lalaloc: Latent layout localisation in dynamic, unvisited environments. In Proceedings of the IEEE/CVF International Conference on Computer Vision, pages 10107-10116, 2021.) uses a prior 3D model based on floorplan for indoor localization. For each query image, its convolutional features are compared with layout features of a 3D model rendered from different positions and the nearest pose in the grid is iteratively refined.

Wijmans et. al. (see Erik Wijmans and Yasutaka Furukawa. Exploiting 2d floorplan for building-scale panorama rgbd alignment. In Proceedings of the IEEE Conference on Computer Vision and Pattern Recognition, pages 308-316, 2017.) employs a floorplan and scan alignment given RGB-D panoramas of large indoor scenes. Initial scale of a scan is selected manually, after which alignment is estimated as a scan transformation in superposition of four rotations (0, 90, 180, 270) and a 2D translation.

The latter related art may be regarded as the closest analogue to the disclosure.

SUMMARY

This section which discloses various aspects of the embodiments of the disclosure is intended for providing a brief overview of the claimed subject matters and their embodiments. Detailed characteristics of technical means and methods that implement the combinations of features of the claimed embodiments are provided hereinbelow. Neither this summary nor the detailed description provided below together with accompanying drawings should be regarded as limiting the scope of the claimed embodiments. The scope of legal protection of the claimed invention is only defined by the appended set of claims.

The disclosure is generally aimed at creating 3D scene model(s) in such technical fields as photogrammetry, object positioning systems, mobile and static 3D scanning systems for various indoor environments (apartments, offices, shops etc.).

Technical problem to be solved by the present invention consists in optimization (refinement) of camera poses within a 3D scene being scanned by the at least one camera.

Object of the disclosure is to provide a method and system for floorplan-aware camera pose refinement.

Technical result achieved by using the claimed invention consists in improving the accuracy of at least one scan of a 3D scene, using an automatically obtained full scheme of the scene.

According to an aspect of the disclosure, a method performed by at least one processor for floorplan-aware camera pose refinement, comprises receiving a floorplan of a three-dimensional (3D) structure of a scene; receiving one or more imaging scans of the scene; identifying a gravity direction for the one or more imaging scans; generating, based on the gravity direction, a boundary scan by filtering out one or more points in the one or more imaging scans having horizontal projections that deviate from other points in the one or more imaging scans by a predetermined amount; aligning the boundary scan with the floorplan; extracting one or more structural elements in the one or more imaging scans; and optimizing a three-term cost function comprising a geometric term, a floor term and, a walls term by correlating points in the one or more imaging scans corresponding to the structural elements to respective points in the floorplan.

According to an aspect of the disclosure, the three-term cost function is formulated as: $L=L_{geom}+\lambda_{floor}L_{floor}+\lambda_{walls}L_{walls}$, wherein $L_{geom}$ is the geometric term, $L_{floor}$ is the floor term, and $L_{walls}$ is the walls term, and wherein $\lambda_{floor}$ and $\lambda_{walls}$ are weight coefficients configured to make contributions of all terms of the three-term cost function equal.

According to an aspect of the disclosure, the floorplan is a 3D floorplan obtained from a set of 3D points generated based on a vector image with one or more walls depicted as segments.

According to an aspect of the one or more imaging scans of the scene are one or more RGB-D scans comprising one or more RGB image frames, depth data, and camera pose information.

According to an aspect of the disclosure, the floorplan is represented by a set of planes approximating one or more walls within the scene, wherein the correlating the points in the one or more imaging scans to the respective points in the floorplan comprises: correlating the points in the one or more imaging scans to nearest floorplan planes by (i) finding a nearest floorplan point for each point in the one or more imaging scans and (ii) estimating a distance of each nearest floorplan point to a corresponding wall plane; and obtaining the walls term $L_{walls}$ by averaging the estimated distances.

According to an aspect of the disclosure, the correlating the points in the one or more imaging scans to the respective points in the floorplan comprises: clustering a plurality of the points in the one or more imaging scans based on a normal of the plurality of points into one or more clusters of points; fitting one or more vertical wall planes for the one or more clusters of points by defining the one or more vertical wall planes such that a deviation of points in the one or more clusters from a given plane is minimized; matching the one or more vertical wall planes with respective floorplan wall planes; calculating a point-plane distance for each pair of a given point cluster and a respective vertical wall plane; and obtaining the walls term $L_{walls}$ by summing the point-plane distances.

According to an aspect of the disclosure, the aligning the boundary scan with the floorplan and the optimizing the three-term cost function are alternated in an iterative manner.

According to an aspect of the disclosure, a system for floorplan-aware camera pose refinement, the system comprising: a memory storing instructions; and at least one processor operatively coupled to the memory and configured to execute the one or more instructions stored in the memory, wherein the one or more instructions, when executed by the at least one processor, cause the system to: receive a floorplan of three-dimensional (3D) structure of a scene which reflects the prior structure of the scene; receive one or more imaging scans of the scene; identify a gravity direction for the one or more imaging scans; generate, based on the gravity detection, a boundary scan by filtering out one or more points in the one or more imaging scans having horizontal projections that deviate from other points in the one or more imaging scans by a predetermined amount; align the boundary scan with the floorplan; extract one or more structural elements in the one or more imaging scans; and optimize a three-term cost function comprising a geometric term, a floor term, and a walls term by correlating points in the one or more imaging scan corresponding to the structural elements, to respective points in the floorplan.

According to an aspect of the disclosure the three-term cost function is formulated as: $L=L_{geom}+\lambda_{floor}L_{floor}+\lambda_{walls}L_{walls}$, wherein $L_{geom}$ is the geometric term, $L_{floor}$ is the floor term, and $L_{walls}$ is the walls term, $\lambda_{floor}$ and $\lambda_{walls}$ are weight coefficients configured to make contributions of all terms of the three-term cost function equal.

According to an aspect of the disclosure, the floorplan is a 3D floorplan obtained from a set of 3D points generated based on a vector image with one or more walls depicted as segments.

According to an aspect of the disclosure, the one or more imaging scans of the scene are one or more RGB-D scans comprising one or more RGB image frames, depth data, and camera pose information.

According to an aspect of the disclosure, the floorplan is represented by a set of planes approximating one or more walls within the scene, wherein, to perform correlating the points in the one or more imaging scans to respective points in the floorplan, the at least one processor is configured to: correlate the points to nearest floorplan planes by finding the nearest floorplan point for each point and estimating a distance to the corresponding wall plane; and obtain the walls term $L_{walls}$ by averaging the estimated distances.

According to an aspect of the disclosure wherein, to perform pulling points in the one or more imaging scans to respective points in the floorplan, the one or more instructions cause the system to: cluster a plurality of the points in the one or more imaging scans based on a normal of the plurality of points into one or more clusters of points; fit one or more vertical wall planes for the one or more clusters of points by defining one or more vertical wall planes such that a deviation of points in the one or more clusters from a given plane is minimized; match the vertical wall planes with respective floorplan wall planes; calculate a point-plane distance for each pair of a given point cluster and a respective vertical wall plane; and obtain the walls term $L_{walls}$ by summing the point-plane distances.

According to an aspect of the disclosure, the one or more instructions cause the system to alternate said aligning the boundary scan with the floorplan and said optimizing the three-term cost function in an iterative manner.

According to an aspect of the disclosure, a non-transitory computer readable medium having instructions stored therein, which when executed by a processor cause the processor to execute a method comprising: receiving a floorplan of a three-dimensional (3D) structure of a scene; receiving one or more imaging scans of the scene; identifying a gravity direction for the one or more imaging scans; generating, based on the gravity direction, a boundary scan by filtering out one or more points in the one or more imaging scans having horizontal projections that deviate from other points in the one or more imaging scans by a predetermined amount; aligning the boundary scan with the floorplan; extracting one or more structural elements in the one or more imaging scans; and optimizing a three-term cost function comprising a geometric term, a floor term and, a walls term by correlating points in the one or more imaging scans corresponding to the structural elements to respective points in the floorplan.

According to an aspect of the disclosure, the three-term cost function is formulated as: $L=L_{geom}+\lambda_{floor}L_{floor}+\lambda_{walls}L_{walls}$, wherein $L_{geom}$ is the geometric term, $L_{floor}$ is the floor term, and $L_{walls}$ is the walls term, and wherein $\lambda_{floor}$ and $\lambda_{walls}$ are weight coefficients configured to make contributions of all terms of the three-term cost function equal.

According to an aspect of the disclosure, the floorplan is a 3D floorplan obtained from a set of 3D points generated based on a vector image with one or more walls depicted as segments.

According to an aspect of the disclosure, the one or more imaging scans of the scene are one or more RGB-D scans comprising one or more RGB image frames, depth data, and camera pose information.

According to an aspect of the disclosure, the floorplan is represented by a set of planes approximating one or more walls within the scene, wherein the correlating the points in the one or more imaging scans to the respective points in the floorplan comprises: correlating the points in the one or more imaging scans to nearest floorplan planes by (i) finding a nearest floorplan point for each point in the one or more imaging scans and (ii) estimating a distance of each nearest floorplan point to a corresponding wall plane; and obtaining the walls term $L_{walls}$ by averaging the estimated distances.

According to an aspect of the disclosure, wherein the correlating the points in the one or more imaging scans to the respective points in the floorplan comprises: clustering a plurality of the points in the one or more imaging scans based on a normal of the plurality of points into one or more clusters of points; fitting one or more vertical wall planes for the one or more clusters of points by defining the one or more vertical wall planes such that a deviation of points in the one or more clusters from a given plane is minimized; matching the one or more vertical wall planes with respective floorplan wall planes; calculating a point-plane distance for each pair of a given point cluster and a respective vertical wall plane; and obtaining the walls term $L_{walls}$ by summing the point-plane distances.

It will be clear to ones skilled in the art that the embodiments of the present disclosure are not limited to the aspects as outlined above, and the invention may take the form of other subject matters, such as a device, a computer program, or a computer program product. Additional features which may characterize particular embodiments of the present invention will be apparent for persons skilled in the art from the detailed description of embodiments provided below.

DESCRIPTION OF DRAWINGS

Drawings are provided in this document to facilitate the understanding of the essence of the disclosure. Drawings are schematic and not drawn to scale. The drawings are for illustrative purposes only and are not intended to define the scope of the disclosure.

FIG. 8 provides a visualization of an NSD metric for wall point-cloud W before and after camera pose refinement according to one or more embodiments of the disclosure.

DETAILED DESCRIPTION

Figure 1:
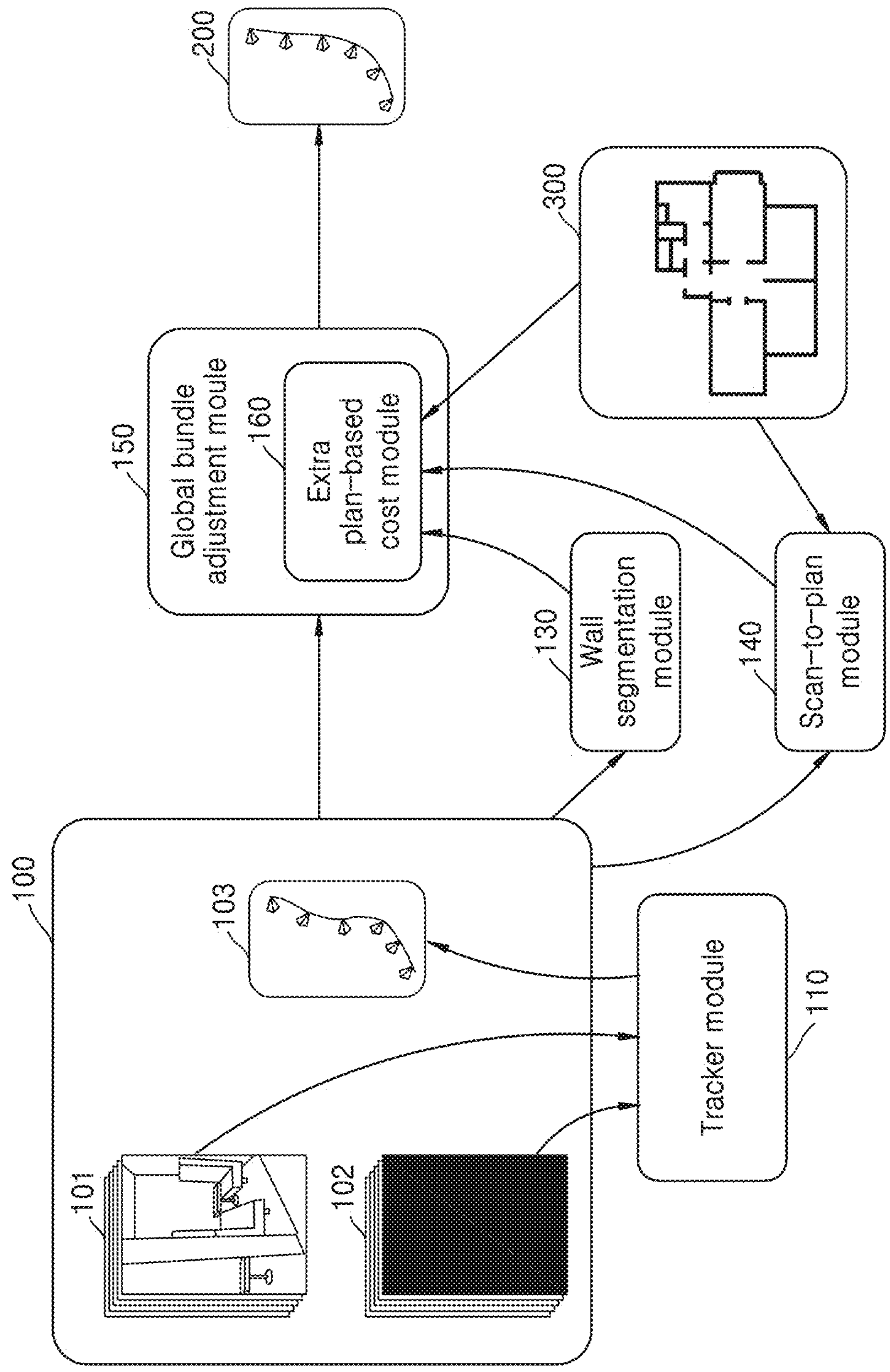
FIG. 1 schematically illustrates an exemplary structure of a general pipeline according to one or more embodiments of the disclosure.

Exemplary embodiments of the present disclosure are described in detail below. The exemplary embodiments are illustrated in the appended drawings, where same or similar reference numerals may designate the same or similar elements, or elements which have the same or similar functions. Exemplary embodiments described with reference to the appended drawings are illustrative and are only used for explaining the present disclosure and should not be regarded as any restrictions thereto.

One or more embodiments of the present disclosure proposes a novel camera pose refinement approach which expands the concept of bundle adjustment (or BA for short). Bundle adjustment is generally known to be simultaneous refining of 3D coordinates describing scene geometry, parameters of relative motion, and optical characteristics of camera(s) employed to acquire the images of the 3D scene, given a set of images depicting a number of 3D points from different viewpoints. Bundle adjustment refers to geometrical bundles of light rays originating from each 3D feature and converging on each camera's optical center, which are optimally adjusted according to an optimality criterion involving the corresponding image projections of all points.

One or more embodiments of the present disclosure receives posed RGB-D frames and updates camera poses according to the structure of the environment provided in the form of a floorplan. Each RGB-D frame may be a data portion which may include an RGB image and a respective depth image, which originate from a camera, for which pose information is to be refined. In photogrammetric and computer vision applications, a pose of an object (e.g., a camera) is universally understood as a combination of position and orientation. In one or more examples, a floorplan, in this context, may be regarded as a data portion which describes a diagrammatic representation of a structure of a given 3D scene in a view from above, showing relationships between 3D scene parts such as rooms, spaces, partitions such as walls, and other physical features at one level of the structure of the 3D scene. In one or more examples, in the context of an indoor 3D scene, such as within a room, a base level of the structure of the 3D scene may be, by way of a non-limiting example, a floor level.

In one or more examples, RGB-D frames in the present context are obtained using RGB-D cameras, which may be generally also referred to as range cameras, which are sensor devices used for producing a "range image". A RGB-D camera may be a type of depth camera that provides both depth (D) and color (RGB) data as the output in real-time. Depth information is retrievable through a depth map/image which is created by a 3D depth sensor such as a stereo sensor or time of flight sensor. RGBD cameras are able to do a pixel-to-pixel merging of RGB data and depth information to deliver both in a single frame. Range cameras can operate according to a number of different techniques. By way of a non-limiting example, these may be, in particular, time of flight (ToF) cameras (for instance, such as a camera provided in a smart phone), or laser sensors (e.g. lidar). Other types of range cameras suitable for use in the present disclosure will also be apparent to persons skilled in the art, and the present disclosure is not restricted to any specific range camera types or techniques.

Aligning a scan, which may reflect the current state of a scene with the floorplan can help not only improve the scan, but also obtain a full scheme of the scene.

The novel optimization algorithm underlying one or more embodiments of the present disclosure expands conventional BA by making use of prior knowledge about the scene structure. First, for example, if it is known that the scene under reconstruction is an indoor premise, then it may be presumed that the floor surface is generally flat and close to a plane. Second, in an indoor premise, it is presumed that there are one or more walls that may be generally flat as well and may be consistent to the walls on the floorplan. These considerations generally lead to an extra cost that is added to the optimization problem in the course of 3D scan refinement. In addition to BA loss, 3D scene floor and walls are extracted, and these structural elements are pulled to corresponding elements on the floorplan.

FIG. 1 schematically illustrates an exemplary structure of a general pipeline according to one or more embodiments of the present disclosure.

In the context of the present disclosure, a floorplan, such as floorplan 300 shown in FIG. 1, may be assumed to be a vector image with walls depicted as segments. For subsequent optimization, a 3D floorplan is generated based on this vector image. For a 2D floorplan segment, coordinates of its endpoints (e.g. wall endpoints, such as corners of a room) may be considered, and for each of the endpoints two 3D points may be generated by adding a third coordinate that corresponds to a height and has a minimum and a maximum equal to floor and ceiling height (e.g., minimum and maximum values $y_{min}$, $y_{max}$, respectively). This results, for example, in 2 3D points for each corner, and four points (e.g., 2 points for each of its two ends) for each segment. The created rectangle (e.g., consisting of 2 pairs of points: two for each segment endpoint) may approximate the 3D position of the wall depicted as floorplan segment. Subsequently, to create a 3D wall surface corresponding to this segment, points may be uniformly sampled (e.g., randomly selected within the created rectangle). By applying this procedure to each floorplan segment, a 3D floorplan may be obtained from the resulting set of 3D points.

One or more embodiments of the present disclosure is directed to a computer-implemented method for floorplan-aware camera pose refinement and a respective system, which may be implemented using a number of modules. Ones skilled in the art will appreciate that these modules may be implemented by software and/or hardware in different specific implementations, without limiting the present disclosure to any specific selection of software and/or hardware means for implementing said modules. Said modules may exist in the form of a program or programs, program modules, one or more processors programmed to perform respective function(s), ASICs, integrated circuits, microchips, FPGAs, where applicable. One or more modules may be implemented as neural networks as ones skilled in the art will appreciate.

An example of the general pipeline according to the present disclosure is shown in FIG. 1. The pipeline may employ a superimposed RGB-D scan 100 and floorplan 300 as input data. The superimposed RGB-D scan 100 may be comprised of one or more RGB images 101 and one or more depth images 102. These data may be input into a tracker module 110 to be processed and provide an input camera pose 103. The latter may be input in a floor and a walls segmentation module 130 for processing to result in one of the three cost function terms. A scan-to-plan alignment module 140 may receive an input camera pose 103 and floorplan 300, and performs an alignment of these data to result in another one of the three cost function terms. A global bundle adjustment module 150 also may receive, as input, the input camera pose 103. As part of the global bundle adjustment module 150, an extra plan-based cost module 160 may be employed, which may receive, as input, the above-mentioned cost function terms from the floor and walls segmentation module 130 and scan-to-plan alignment module 140, as well as a floorplan 300. The extra plan-based cost module 160 may perform the optimization of the three-term cost function, which results in optimized camera pose 200, which may also be referred to as a refined camera pose.

To compute the cost function that is to be minimized as part of the optimization, a number of auxiliary operations may be performed, including, but not limited to scan-to-plan alignment and the segmentation of structural elements of the scene.

Figure 9:
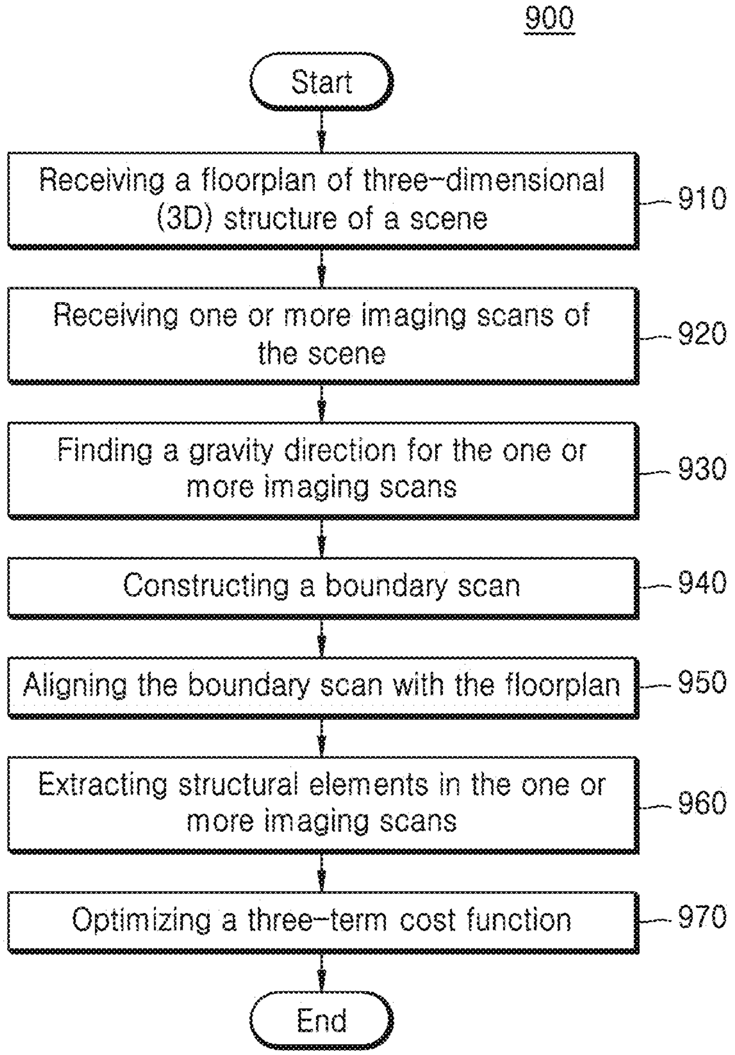
FIG. 9 shows a flowchart of the floorplan-aware camera pose refinement method according to one or more embodiments of the disclosure.

FIG. 9 illustrates a flow diagram of a method 900 for floorplan-aware camera pose refinement, according to one or more embodiments.

At operation 910, a floorplan of a three-dimensional (3D) structure of a scene, which reflects the structure of the scene is received. The floorplan, in accordance various non-limiting embodiments of the present disclosure, is a 3D floorplan obtained from a set of 3D points generated based on a vector image with walls depicted as segments. In one or more examples, the 3D floorplan may be represented by a set of planes approximating walls within the 3D scene.

At operation 920, one or more imaging scans of the scene are received. The one or more imaging scans of the scene may be obtained by various means, not limited to, for example, being obtained by a camera, a LIDAR sensor, or any other suitable imaging means known to one of ordinary skill in the art.

At operation 930, a gravity direction for the one or more imaging scans is identified. In one or more examples, the gravity direction may correspond to a gradient vector for image intensity. For example, if an image is becoming more dense from left to right, the gravity direction may be from left to right.

At operation 940, a boundary scan is generated by filtering out points in the one or more imaging scans whose horizontal projections are statistical outliers. In one or more examples, operation 940 may be performed on the image scans based on the identified gravity direction. In one or more examples, a statistical outlier may be a point that deviates from other points in a scan by a predetermined amount.

At operation 950, the boundary scan is aligned with the floorplan.

At operation 960, structural elements in the one or more imaging scans are extracted.

At operation 970, a three-term cost function including a geometric term, a floor term and a walls term may be optimized by pulling points (e.g., correlating or bring closer to) in the one or more imaging scans, which correspond to structural elements, to respective points in the floorplan. The three-term cost function may be formulated as:

$$L = L_{geom} + \lambda_{floor} L_{floor} + \lambda_{wallls} L_{walls}$$

where $L_{geom}$ may be the geometric term, $L_{floor}$ may be the floor term, and $L_{walls}$ may be the walls term. According to one or more embodiments of the present disclosure, pulling points in the one or more imaging scans to respective points in the floorplan may comprise: pulling the points to nearest floorplan planes by finding, for each said point, its nearest floorplan point and estimating a distance to the corresponding wall plane; and averaging said distances for the multiple points to obtain the walls term $L_{walls}$.

According to one or more embodiments of the present disclosure, pulling points in the one or more imaging scans to respective points in the floorplan may comprise: clustering a plurality of said points according to their normal into one or more clusters of points; fitting vertical wall planes for the one or more clusters of points by defining one or more vertical wall planes such that a deviation of points in the one or more clusters from a given plane is minimal; matching wall planes with respective floorplan wall planes, assuming that a given wall plane and a given floorplan wall plane correspond to each other if they are mutually nearest and parallel; calculating a point-plane distance for each pair of a given point cluster and a respective vertical wall plane; and summing the point-plane distances to obtain the walls term $L_{walls}$.

According to one or more embodiments of the present disclosure, operations 950 and 970 may be alternated in an iterative manner.

The operations of the embodiments of the present disclosure will be further discussed in detail. It should be noted, however, that the present disclosure is not limited by the exemplary details and particular examples described below, but should only be defined by the appended claims, with all possible equivalents that will be apparent for a person skilled in the art in the context of the present disclosure.

Scan-to-Plan Alignment

As part of its processing, scan-to-plan alignment module 140 may operate to find a gravity direction. When processing any given superimposed RGB-D scan 100, in one or more examples, it should first be assured that the y-axis points upside and the floor surface is horizontal. If inertial measurement unit (IMU) measurements are available, the gravity direction (vertical) can be defined correctly. In any other case the gravity direction may be estimated using scan normals. Specifically, according to one or more embodiments of the present disclosure, scan-to-plan alignment module 140, as part of its processing, may project scan normals onto a sphere. The most frequent vector may be assumed to define the gravity direction.

This assumption has been experimentally proven by the present disclosure. The superimposed RGB-D scan 100 is rotated so that its y-axis coincides with the gravity direction.

Further, a boundary scan may be constructed. Aligning two non-identical point clouds is the simplest when they are as alike as possible. When the floorplan 300 contains only walls, it is assumed removing the floor and furniture from the scan would be helpful to the optimization process.

According to one or more embodiments of the present disclosure, to remove the floor, a histogram of y-coordinates of scan points with an operation of 15 centimeters (cm) may be built. A peak value of the histogram corresponds to the floor plane. Therefore points located less than 15 cm above the floor may be removed. To remove furniture, points whose horizontal projections are statistical outliers may be filtered out. Further herein, a filtered scan is referred to as the boundary scan since it represents boundaries between rooms.

The boundary scan obtained as mentioned above may then be aligned with the floorplan 300 by the scan-to-plan alignment module 140. To align the boundary scan with the floorplan, in one or more examples, a rotation about the y-axis, shift, and the scale are estimated.

First, processing by the scan-to-plan alignment module 140 may continue to estimate the rotation about the y-axis based on normals of the boundary scan. Just as in the case of estimating the gravity direction as described above, the normals may be projected onto a sphere, and three most frequent orthogonal directions may be selected, where it is ensured that one of these directions coincides with the gravity direction. Then, the other two vectors are projected onto the horizontal plane and the boundary scan is rotated such that the most frequent direction is parallel to the x-axis. The floorplan 300 undergoes a similar procedure in the scan-to-plan alignment module 140: normals may be estimated in the horizontal plane, the most frequent normal direction is found, and the floorplan 300 is rotated such that it becomes parallel to the x-axis.

According to one or more embodiments of the present disclosure, to estimate the scale, a width and height of the scan projection and the floorplan, scaling coefficients according to a width-to-height ratio may be calculated. Finally, a shift value may be chosen such that the geometrical centers of the superimposed RGB-D scan 100 and the floorplan 300 coincide.

Figure 2A:
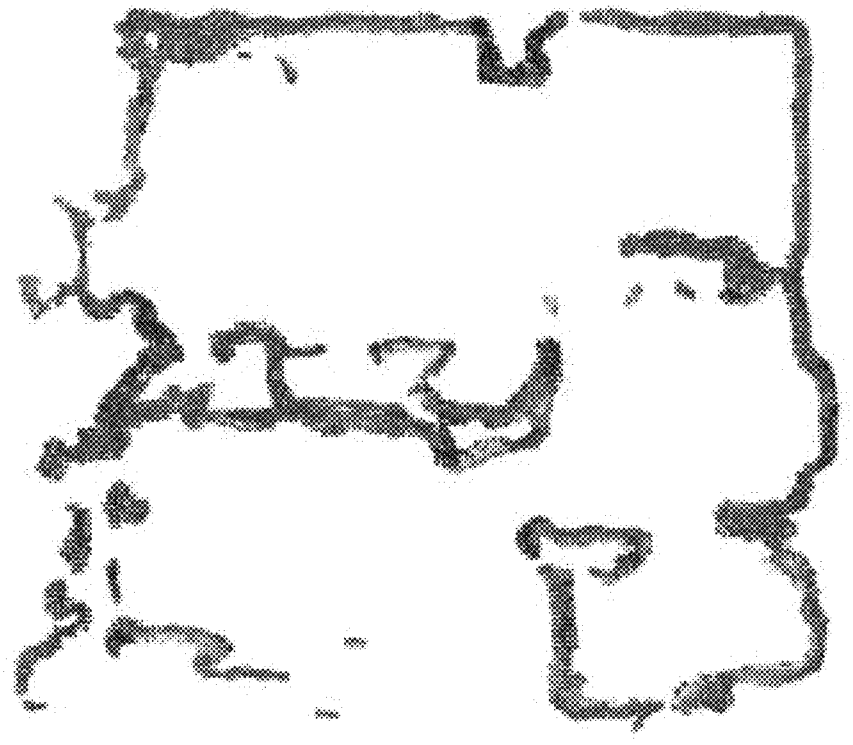
FIG. 2*a* depicts an exemplary filtered scan according to one or more embodiments of the disclosure.
Figure 2B:
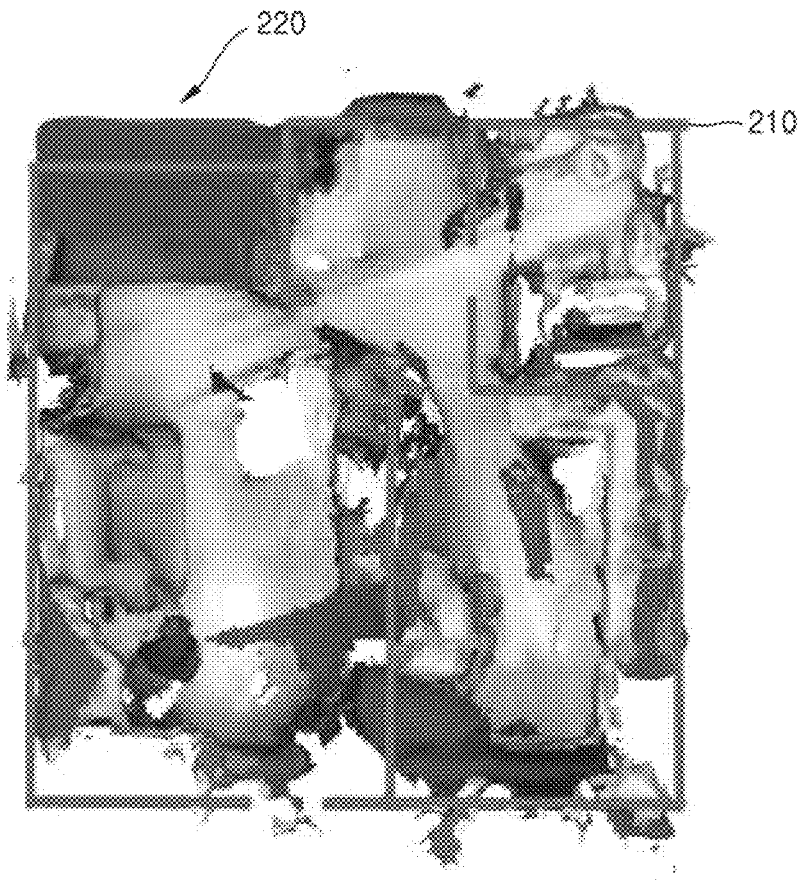
FIG. 2*b* depicts alignment of the scan with floorplan point clouds according to one or more embodiments of the disclosure.

An example of a filtered scan and floorplan alignment is depicted in FIGS. 2*a* and 2*b*, respectively.

FIG. 2*a* depicts an exemplary filtered scan. According to the embodiments of the present disclosure, a boundary scan may be obtained after filtering the points.

FIG. 2*b* depicts alignment of the scan with floorplan point clouds. According to the embodiment of the present disclosure, an aligned floor plan 210 may be obtained over the visualization of the scan 220. In the aligned floor plan 210, while outer borders are aligned quite precisely, inner walls of the scan and the floorplan differ noticeably; apparently, scan geometry is corrupted and requires additional correction.

Floor and Walls Extraction

To pull structural elements of the scan to corresponding elements on the plan, the structural elements in the scan may be found first. As part of the processing by the floor and walls segmentation module 130, since further optimization is conducted relative to the camera poses, and 3D points may be determined as projections of 2D image points into a 3D space, the results of image segmentation are lifted into the 3D space. In one or more examples, in each 2D video frame, floor may be segmented by a semantic segmentation model (floor, ground, and carpet categories are selected), after which only the points labeled as "floor" are projected into the 3D space, thus forming floor point cloud F. Similar procedure is carried out on the walls to obtain a wall framework (point cloud W) that will further be pulled to floorplan walls.

Figure 3:
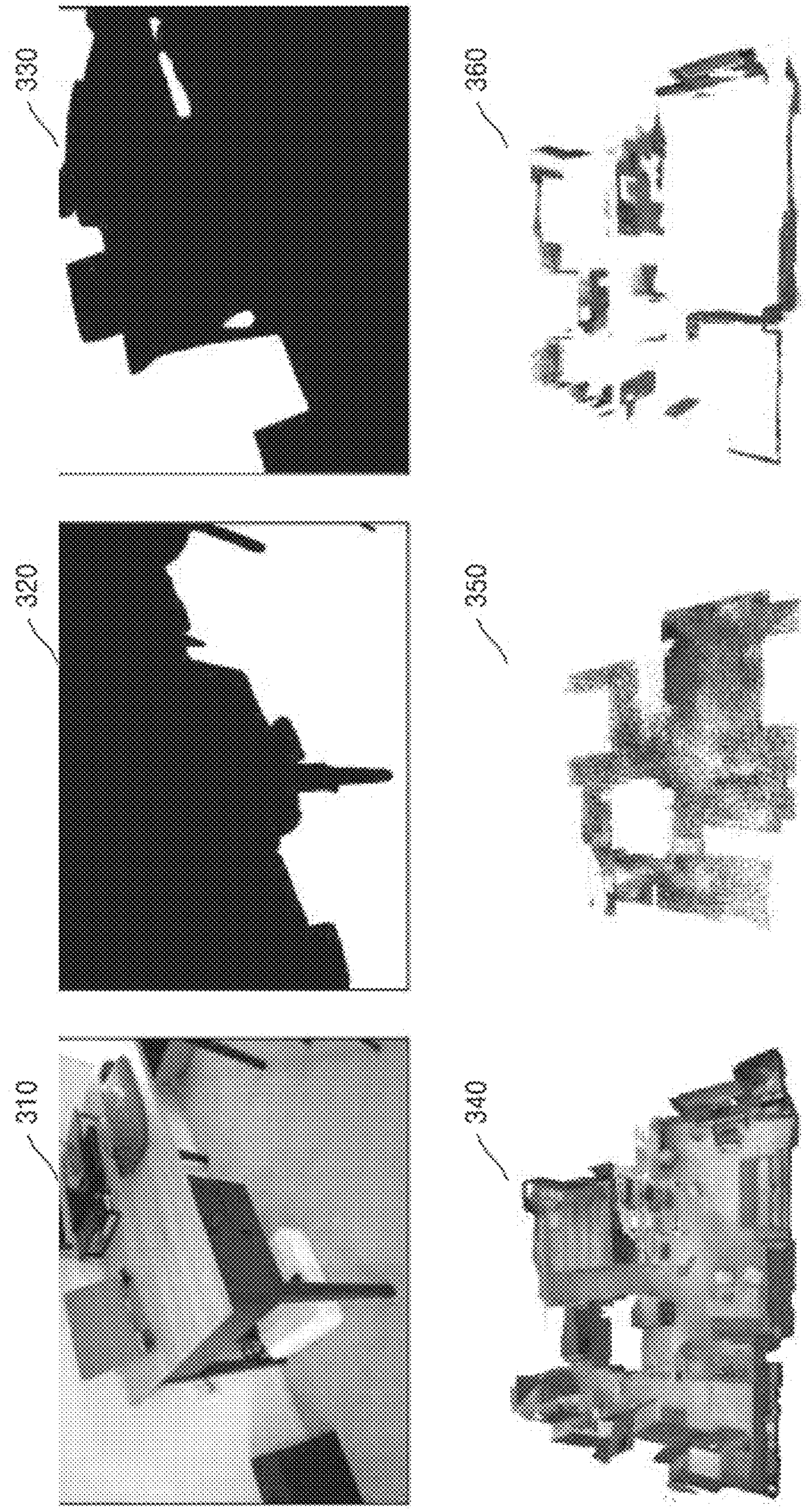
FIG. 3 illustrates an example of floor and wall point cloud construction according to one or more embodiments of the disclosure.

FIG. 3 illustrates an exemplary embodiment of floor and wall point cloud construction. According to one or more embodiments of the present disclosure, a binary mask of the floor 320 and a binary mask of the wall may be obtained over a frame from the sequence 310.

According to one or more embodiments of the present disclosure, a floor point cloud 350 may be obtained by backprojecting the points segmented onto 3D space over full scan (point cloud) 340 of the scene. A wall point cloud 360 may be obtained by backprojecting the points segmented onto 3D space over full scan 340 of the scene.

Cost Function Optimization Process

Processing may be performed by a global bundle adjustment module 150, and an extra plan-based cost module 160 operating as part of the latter. As mentioned above, a three-term cost function as equation 1 below, may be considered: a geometric term focuses on reconstruction consistency, a floor term aims at making the floor surface flat, and a walls term penalizes the discrepancy between the reconstructed walls and the floorplan 300.

$$L = L_{geom} + \lambda_{floor}L_{floor} + \lambda_{wallls}L_{walls} \quad \text{Eq. (1)}$$

First, the geometric term $L_{geom}$ will be discussed. According to one or more embodiments of the present disclosure, to enforce structural consistency in a 3D space, a geometric term is employed that represents 3D discrepancy of 3D point estimates from two views. Hereinafter, this term will be also referred to herein as a 3D point error. Incorporating depth into the superimposed RGB-D scan 100 increases the robustness of bundle adjustment (BA) processing performed by the global bundle adjustment module 150 and allows to handle complicated configurations without incurring the risks posed by a reprojection-based cost function.

To determine the geometric term, first, keypoints are extracted from all given frames with SuperPoint (see e.g. Daniel DeTone, Tomasz Malisiewicz, and Andrew Rabinovich. Super-point: Self-supervised interest point detection and description. pages 337-33712, 06 2018., the entire contents of which are incorporated by reference), and these keypoints are matched across the frames. SuperPoint may refer to a self-supervised framework for training interest point detectors and descriptors suitable for a large number of multiple-view geometry problems in computer vision. As opposed to patch-based neural networks, this fully-convolutional model operates on full-sized images and jointly computes pixel-level interest point locations and associated descriptors in one forward pass. Using depth maps, the extracted keypoints are backprojected to the 3D space, and distances between 3D points projected from different frames are calculated.

For an i-th RGB-D frame $I_i$, let $K_i$ be the keypoints detected in the given RBG-D frame. For a keypoint k from $K_i$, let p(k) denote its backprojection into the 3D space with respect to the i-th camera.

For each pair of matched keypoints (k, k'), these keypoints are backprojected, which gives a pair of 3D points (p, p'). Denoting all such pairs as M, the geometric term is formulated as:

$$L_{geom} = \sum_{(p,p')\in M} \|p - p'\|_2$$

Since floor and walls are typically textureless or covered with repetitive patterns, numerous mismatches may occur. $L_{geom}$ aims to bring matched points closer, so mismatches impose a risk of scan corruption. According to one or more embodiments of the present disclosure, pulling mismatched points may be compensated by floor-to-plane and walls-to-floorplan pulling.

In one or more examples, the term "pulling" in the context of the present disclosure should be understood as "bringing closer" ("snapping-to") points that correspond to structural elements of the superimposed RGB-D scan (walls/floors extracted at the corresponding method operation) to respective walls/floors in the floorplan. This "pulling" is substantially the essence of the optimization of the floor term and the walls term of the cost function.

Floor-to-Plane (F2P) Pulling

The floor term $L_{floor}$ of the cost function ensures the floor surface is a plane. According to one or more embodiments of the present disclosure, to eliminate floor unevenness and layering, floor points may be pulled to the plane $\pi_F$ estimated by floor point cloud. The statistical outliers (e.g., by way of a non-limiting example, 2% of the highest and lowest points, or points that deviate from an average or mean by one standard deviation) of floor point cloud may be filtered out, and a plane is fitted into this point cloud. The plane may be calculated once and remains fixed during the cost function optimization. When the floor plane is estimated, F2P loss may be calculated as the mean distance between points segmented as floor and the floor plane by the following as:

$$L_{floor} = \sum_{p\in P_F} dist(p, \pi_F) \quad \text{Eq. (2)}$$

This term may be added to the loss with the weight coefficient $\lambda_{floor}$. This weight coefficient may be selected heuristically for each dataset. It is selected to make the contribution of all the terms of loss function equal and so that not only the sum, but each term is minimized during the optimization. By way of a non-limiting example, in the case of exemplary datasets which will be further discussed hereinbelow, for Redwood dataset $\lambda_{floor}$=10 and $\lambda_{walls}$=0.6, while for a dataset collected using Samsung S20+, $\lambda_{floor}$=10 and $\lambda_{walls}$=0.5. As understood by one of ordinary skill in the art, these features are only exemplary values, and the scope of the present disclosure is in no way restricted by these values.

Walls-to-Floorplan (W2P) Pulling

In one or more examples, unlike the floor which can be represented as a single plane, walls consist of numerous plane segments. These segments should not only be flat, but also should correspond to the walls from the floorplan 300. Similarly to the floor, points segmented as walls are pulled to the floorplan 300 walls. Due to the multiple borders in a scene, first it is necessary to ascertain, which points should be pulled to which walls. By way of a non-limiting example, several approaches to walls-to-floorplan pulling may be used in the context of the present disclosure: nearest point, iterative nearest wall, and fixed nearest wall. These approaches will be further discussed hereinbelow.

According to one or more embodiments of the present disclosure, in the nearest point approach, for each point p from Pw, the nearest floorplan point q (p) is found, and a distance between these two points may be calculated. In such case, the walls term may be an average of such distances as:

$$L_{walls}^{NP} = \sum_{p \in P_W} \|p - q(p)\|_2 \quad \text{Eq. (3)}$$

This pulling strategy may depend much on how densely the 3D floorplan is covered with points. In practice, the coverage might be insufficient to ensure stable convergence. However, due to noise, point-to-point pulling brings the wall points closer to the ground truth, but it does not make the walls more flat.

According to one or more embodiments of the present disclosure, in the iterative nearest wall approach, alternatively, the points in Pw may be pulled to the nearest floorplan planes instead of the nearest floorplan points. In this approach, floorplan 300 is represented by a set of planes $\{\pi^f\}$ approximating the walls. For each point p from Pw, its nearest floorplan point q(p) is found, and a distance to the corresponding wall plane $\pi^f$(q(p)) is estimated. These distances are averaged to obtain the walls term as:

$$L_{walls}^{INW} = \sum_{p \in P_W} dist\left(p, \pi^f(q(p))\right) \quad \text{Eq. (4)}$$

In this strategy, nearest points need to be found in each operation, which makes cost function optimization very slow. Another major drawback is that two points in Pw cloud belonging the same wall may be pulled to different floorplan 300 planes, especially in areas where walls intersect.

According to one or more embodiments of the present disclosure, in the fixed nearest wall approach, to speed up the cost function optimization process, correspondence between points in Pw and floorplan 300 wall planes may be established and kept unchanged during cost function optimization.

First, Pw points are clustered according to their normal, and vertical wall planes are fitted. For example, for each cluster of points, a vertical plane is fitted so that the deviation of cluster points from this plane is minimal. Thus, for each cluster, a wall plane is defined. Then, wall planes are matched with the floorplan 300 wall planes, assuming that the wall plane $\pi$ and the floorplan wall plane $\pi^f$ correspond to each other if they are the mutually nearest and parallel.

For each point p from Pw belonging to the wall plane $\pi$, correspondence between this point and the floorplan wall plane $\pi^f$ matched with $\pi$ is established. Hence, cost function optimization may be conducted over a set $\Pi$ of (p, $\pi$), where $\pi$ is estimated once with respect to the initial location of p and remains fixed during cost function optimization. A point-plane distance may be calculated for each pair in $\Pi$, and such distances are summed to obtain the following walls term as:

$$L_{walls}^{FNW} = \sum_{(p,\pi) \in \Pi} dist(p, \pi) \quad \text{Eq. (5)}$$

The established correspondences depend on the mutual assignment of points in PW and floorplan 300 wall planes, which may prevent two nearby points from being assigned to different planes and then pulled in different directions. In one or more examples, when the correspondences are fixed, only the point-plane distances are to be estimated at each cost function optimization operation, which makes this strategy much faster than the other two.

Walls term of loss function is taken with the weight coefficient $\lambda_{walls}$. Similarly to $\lambda_{floor}$, this weight coefficient may be selected heuristically for each dataset.

Since matches between actual (superimposed RGB-D scan 100) walls and floorplan 300 walls may change during optimization, the loss minimization operation (e.g., minimization of three term cost function) and the alignment operation as discussed above are alternated.

One or more embodiments of the present disclosure as described above achieve the optimization (refinement) of camera poses within a 3D scene being scanned by the at least one camera, based on a superimposed RGB-D scan 100 and a floorplan 300. It should be noted that points in the superimposed RGB-D scan 100 of a 3D scene (e.g., such as a room) are backprojections of two-dimensional (2D) points from image frames of the sequence of RGB-D images into a 3D space, which correspond to given camera poses. Refining these 3D points (e.g., calculated as functions of the camera poses) may refine the camera poses per se.

In one or more examples, initial camera poses are used to calculate 3D points based on the superimposed RGB-D scan 100 as described above, and three component loss functions (loss functions L) may be calculated. In one or more examples, a loss function in the context of the present disclosure is a function of the camera poses. One or more embodiments of the present disclosure may minimize this loss function by finding a set of arguments (camera poses), with which the loss function values will be the lowest. Optimization of the cost function (including the three loss function components as mentioned above) results in a new (refined) set of camera poses.

The possibility of implementing the intended use of the claimed system and method, as well as of achieving the technical result as specified above will now be demonstrated on examples which are based on experimental data obtained by the present inventors.

Through experiments on Redwood and a predetermined dataset of RGB-D scans, it is determined that the embodiments of the present disclosure improves the accuracy of 3D reconstruction from RGB-D data.

Experiments verifying the proposed approach have been conducted in a following way. Results of several tracking algorithms were taken as the initial data, and floorplan-aware cost function optimization procedure was carried out in respect of these initial data.

Datasets

Since floorplan-aware camera pose optimization problem has not been addressed yet, there are no benchmarks that could be used directly for experiments and evaluation of efficiency of any solutions for this problem. The problem is solved in two ways: extra annotation of an existing RGB-D dataset and collecting a new dataset.

Although there is a number of SLAM datasets including superimposed RGB-D sequences, the absence of ground truth floor-plan prevents experimenting with them. However, Redwood dataset (see Jaesik Park, Qian-Yi Zhou, and Vladlen Koltun. Colored point cloud registration revisited.

In ICCV, 2017.) turns out to be appropriate for the validation. This dataset contains both superimposed RGB-D sequences and dense ground truth surfaces captured by different sensors (by way of a non-limiting example, Asus Xtion Live camera and FARO Focus 3D X330 HDR scanner). A ground truth surface allows to obtain a floorplan independent of the depth sensor and tracking results. Unlike many other indoor SLAM datasets, Redwood contains large scale data including scenes with several rooms and a large number of partitions. Trajectories of the camera in this dataset have been obtained by their algorithm (see Jaesik Park, Qian-Yi Zhou, and Vladlen Koltun. Colored point cloud registration revisited. In ICCV, 2017.).

However, since tracking approaches develop fast, a newer SLAM is applied to raw RGB-D data to initialize the poses. A related art (see e.g. Zachary Teed and Jia Deng. DROID-SLAM: Deep Visual SLAM for Monocular, Stereo, and RGB-D Cameras. Advances in neural information processing systems, 2021.) was selected since it shows state-of-the-art results on the SLAM benchmarks and suffers from the failure cases less than the other approaches. However, even such a successful algorithm may sometimes be imprecise and needs to be improved.

The second used SMapper dataset has been collected in experiments. It consists of 5 middle and large-scale scenes of apartments and office environments. These scenes have been captured by a Samsung Galaxy S20+ smartphone with a ToF depth sensor and a Google ARCore tracking system inside. All 3D scenes were accompanied by images of their floorplans.

Google ARCore may be a tool for building an augmented reality. The features of Google ARCore may include (i) motion tracking, which shows positions relative to the world, (ii) anchors, which ensures tracking of an object's position over time, (iii) environmental understanding, which detects the size and location of all types of surfaces, (iv) depth understanding, which measures the distance between surfaces from a given point, and (v) light estimation, which provides information about the average intensity and color correction of the environment. Although Google ARCore technology is widely used for various 3D reconstruction applications including augmented reality, it is prone to errors that may not be notable during online execution, but come out when the full estimated trajectory (e.g., a set or a sequence of camera poses) is considered.

Figure 4:
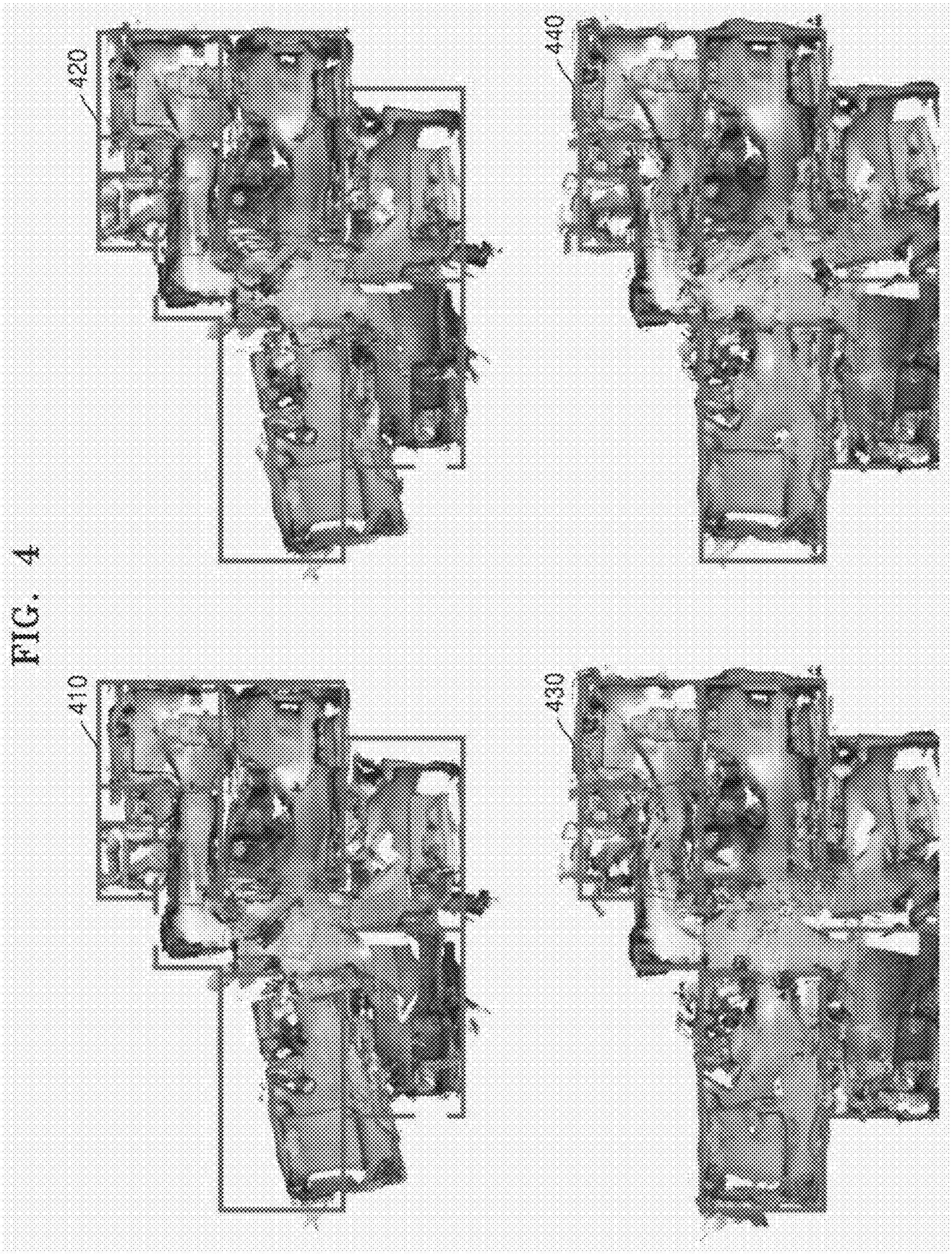
FIG. 4 illustrates exemplary SMapper scan optimization according to one or more embodiments of the disclosure.

FIG. 4 illustrates exemplary SMapper scan optimization according to one or more embodiments.

Referring to FIG. 4, a raw scan 410 indicates the most obvious error: one of the rooms has been turned relative to all other rooms in a scene. According to one or more embodiments of the present disclosure, a scan with floor term application 420 may indicate that a floor pulling term makes the floor smoother and decreases the holes. A scan with wall term application 430 may indicate that walls pulling allows to the room to be put back in place, but corrupts the inner objects. A scan with both floor and wall terms application 440 may correct the geometry.

Metrics

In one or more examples, two types of metrics may be used for approach validation. The metrics of the first type measure the quality of the reconstructed point cloud. Since SMapper dataset does not contain ground truth reconstructions, non-reference metrics were used such as: mean map entropy (MME), mean plane variance (MPV) (see e.g. Jan Razlaw, David Droeschel, Dirk Holz, and Sven Behnke. Evaluation of registration methods for sparse 3d laser scans. In 2015 European Conference on Mobile Robots (ECMR), pages 1-7, 2015.), and mutually orthogonal metric (MOM) (for more information, see e.g. Anastasiia Kornilova and Gonzalo Ferrer. Be your own benchmark: No-reference trajectory metric on registered point clouds, 2021.). In one or more examples, MME is the average entropy of points in their vicinity. Both MPV and MOM estimate the flatness of the surfaces on a scan. The key difference between them is the planar assumption: MPV assumes most surfaces in the scan are planar and MOM does not. Instead, MOM estimates the triplets of orthogonal planes covered with the points of the scan and computes MPV only for these points.

To calculate MME and MPV, a point cloud was reconstructed by backprojecting depth maps. For each point $p_k$, entropy $h(p_k)$ and corresponding plane error $v(p_k)$ in a local vicinity $W(p_k)$ were calculated. To calculate $v(p_k)$, a plane was approximated from 3D points, and a distance from every point to said plane was estimated. For MOM evaluation, the plane error was not averaged over all the points, but only over the points located on three orthogonal planes. These planes were estimated distinctly for the depth maps backprojections, and the MPV of the selected points was averaged over the maps.

These three metrics (MME, MPV, MOM) measure how structured a given obtained superimposed RGB-D scan is (e.g., high entropy and plane variance of points reflect the noisiness and the absence of structure while low entropy and plane variance confirm that the data is more structured and has less noise). For example, the smaller values these metrics have, the higher quality the superimposed RGB-D scans have.

Additionally, to these no-reference metrics, for Redwood dataset, nearest neighbour distance (NND) to ground truth was calculated, which is the average distance from the points of reconstruction to the nearest point of ground truth surface. To calculate this distance, in one or more examples, it is necessary to align the reconstructed point cloud and the ground truth one. In one or more examples, a Deep Global Registration method is used (for more information, see e.g. Christopher Choy, Wei Dong, and Vladlen Koltun. Deep global registration. In CVPR, 2020.).

The second type of metric shows how close the wall framework of the scan is to a 2D floorplan. For each 3D point labeled as a wall, its vertical coordinate was eliminated, and distances between resulting 2D point and all floorplan segments (s1, s2, . . . , sn) were calculated. The distance was calculated as a Euclidean distance between a line and a point, but it was further checked whether a point projection was close to a segment. Then the nearest segment corresponding to the minimal point-segment distance was selected, and such distances across all points were averaged. This metric is called Nearest Segment Distance (NSD) as:

$$NSD = \frac{1}{|W|}\sum_{p \in W} \min(d(p_{xy}, s_1), \ldots d(p_{xy}, s_n)) \quad \text{Eq. (6)}$$

In this equation, the function d(p,s) is defined as:

$$d(p, s) = \begin{cases} \frac{(c \times a)}{|a|}, & \frac{(c, a)}{|a|^2} \in (-\varepsilon, 1+\varepsilon); \\ \max dist, & \text{else.} \end{cases} \quad \text{Eq. (7)}$$

$$c = p - s^0,\ a = s^1 - s^0$$

Here (•,•) is a dot product, and (•X•) is a cross product.

Results

To validate the proposed approach, the above-described optimization terms were applied, and the results of reconstruction were compared. Tables 1 and 2 below illustrate a comparison of application of different loss terms to SMapper and Redwood datasets.

According to the experiments, even pure BA application improved the quality of the RGB-D scans. The difference was especially notable on the SMapper dataset, annotated with Google ARCore, which is fast but not perfectly accurate. However, the quality of reconstructions obtained using Droid SLAM was also improved after bundle adjustment. The further rows of the Tables correspond to application of pulling terms and confirm the further improvement. These results are expected for F2P, which makes floor more flat and therefore, decreases the entropy and plane variance. Changes in reconstructions are illustrated in FIGS. 5 and 6.

Figure 5:
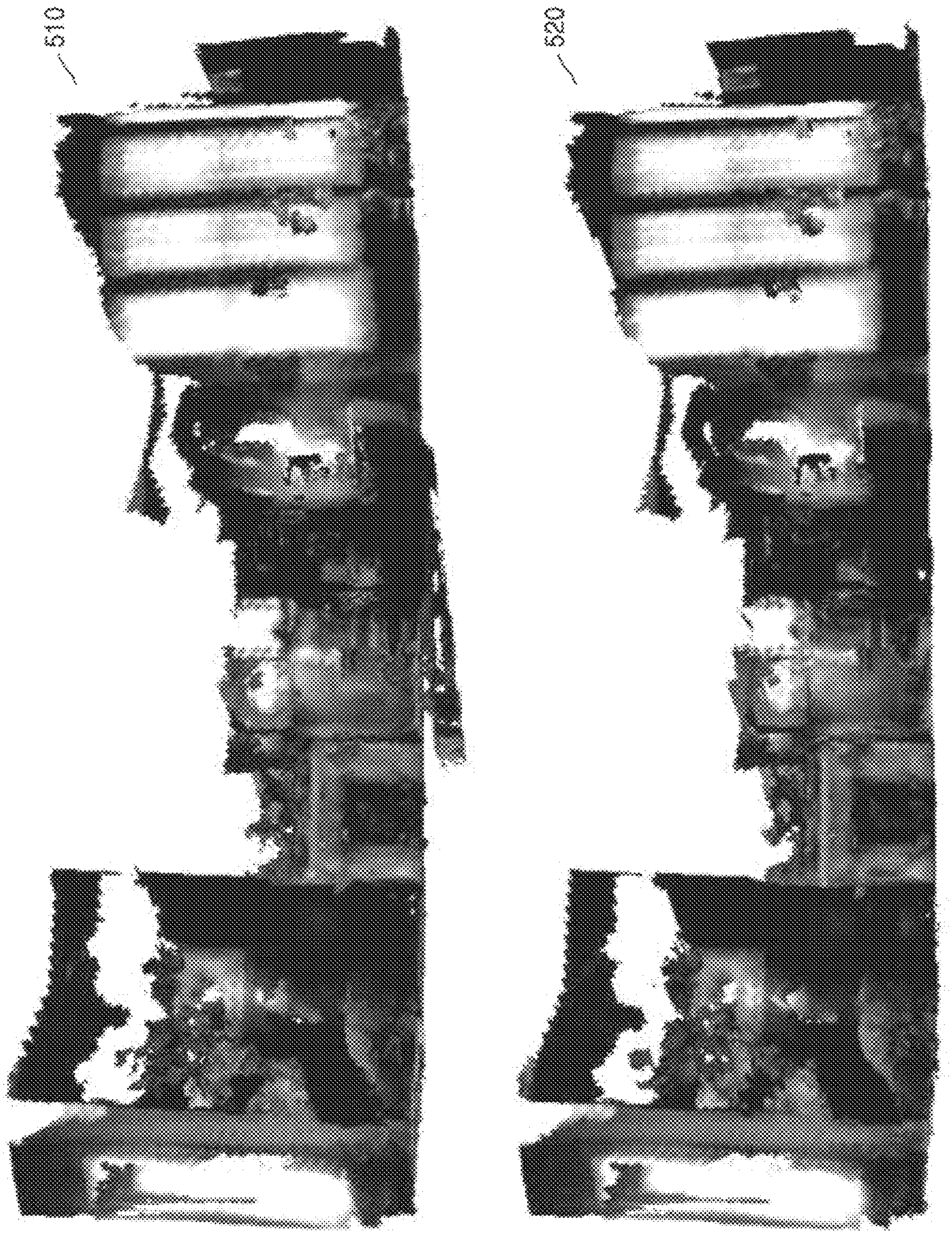
FIG. 5 illustrates exemplary Redwood scan optimization according to one or more embodiments of the disclosure.

FIG. 5 illustrates exemplary Redwood scan optimization according to one or more embodiments. A raw scan 510 indicates that the floor is uneven. According to one or more embodiments of the present disclosure, corrected scan 520 indicates that the floor becomes flat after optimization. In this regard, based on the optimization, the uneven floor is corrected to become flat.

Figure 6:
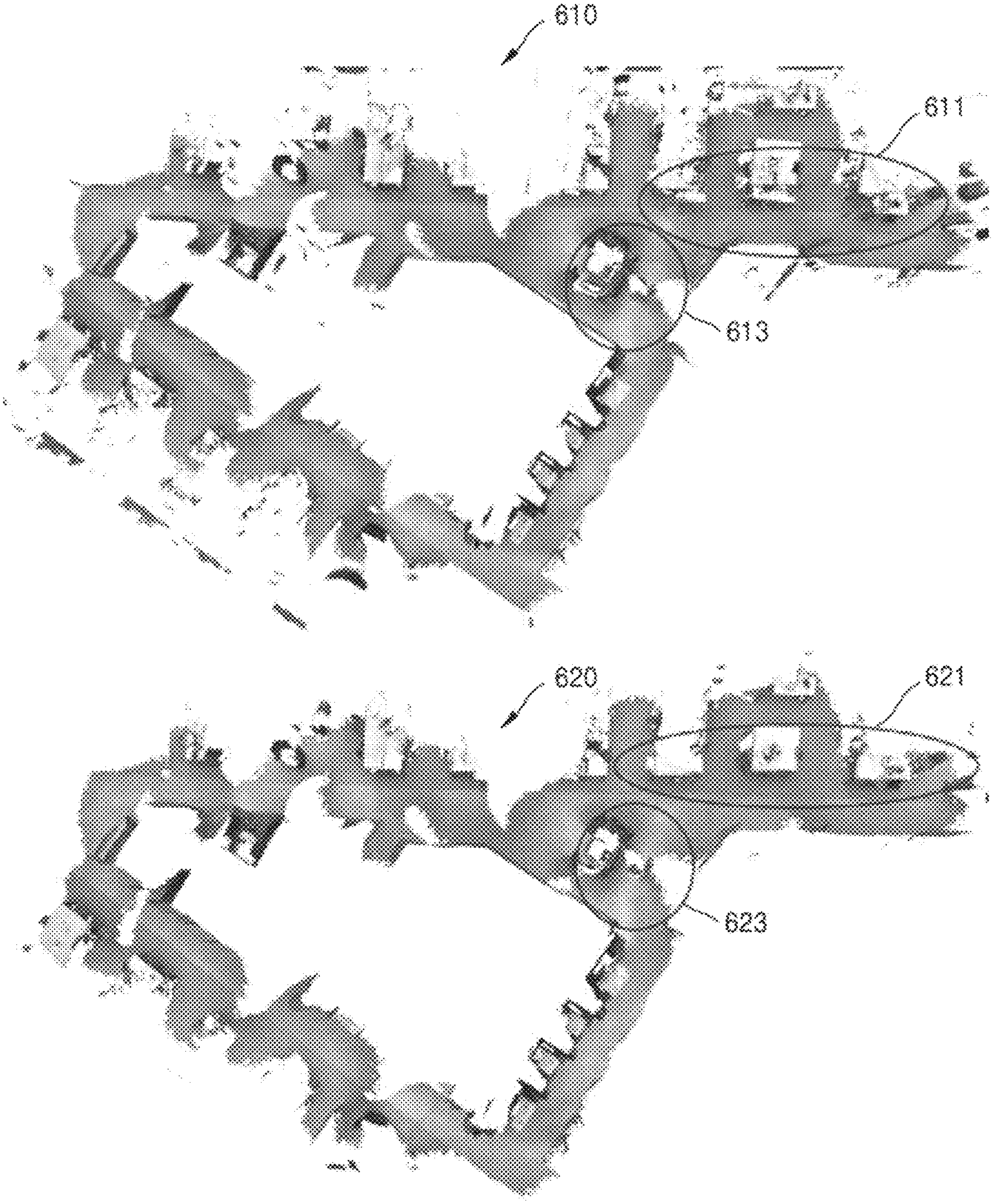
FIG. 6 illustrates exemplary Smapper scan optimization according to one or more embodiments of the disclosure.

FIG. 6 illustrates exemplary Smapper scan optimization according to one or more embodiments. A raw scan 610 indicates that the loop closure failed leading to floor and furniture bifurcation. According to one or more embodiments of the present disclosure, a corrected scan 620 indicates that the bifurcations disappeared and reconstruction error area 611,613 may be corrected to correction area 621,623, respectively.

However, W2P aims at making the walls closer to the floorplan and the straightening is secondary goal in this term. However, wall pulling also improves the value of metrics. Moreover, the experiments show that, although the floors and walls were pulled in different directions and may be prevented from converging to each other, joint usage of both pulling terms further improved the quality.

As regards the floorplan distance, pure BA and floor pulling did not optimize the floorplan distance, but the introduction of wall-pulling terms significantly decreased this distance. According to Tables 1 and 2, the optimal floorplan distance was achieved when both terms were applied. However, the difference between methods with and without floor pulling was insignificant. The NSD metric was expectedly lower for W2P because the latter pulls the walls to the floorplan.

Figure 7:
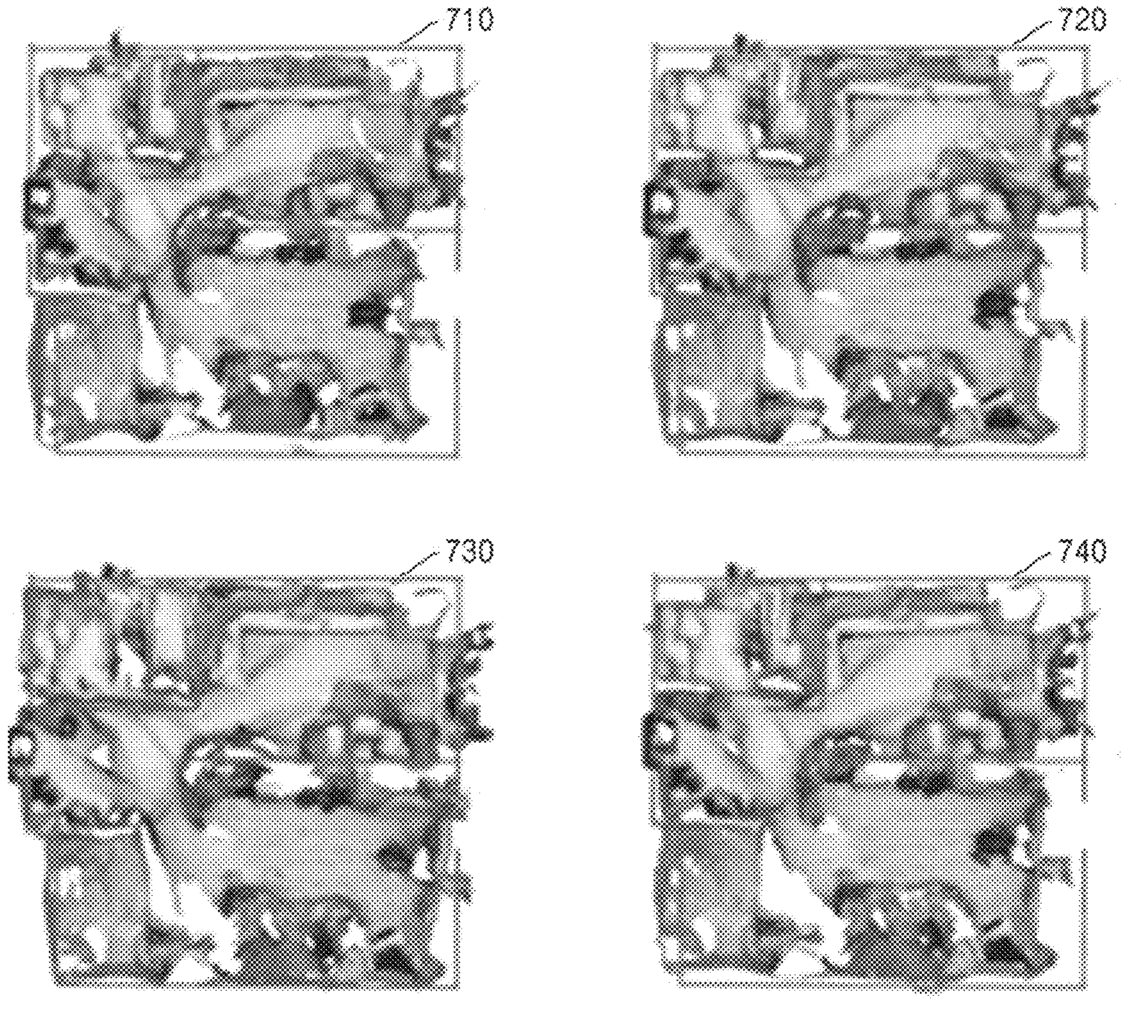
FIG. 7 illustrates exemplary SMapper scan optimization according to one or more embodiments of the disclosure.

FIG. 7 illustrates exemplary SMapper scan optimization according to one or more embodiments.

According to one or more embodiments of the present disclosure, a scan with floor term application 720 may indicate that, compared to a raw scan 710, a floor pulling term makes the floor smoother and decreases the number of holes. A scan with wall term application 730 may indicate that walls pulling allows to the room to be put back in place, but corrupts the inner objects. A scan with both floor and wall terms application 740 may correct the geometry.

FIG. 8 provides a visualization of an NSD metric for wall point-cloud W before and after camera pose refinement.

Referring to the FIG. 8, x and y axis reflect the spatial coordinates (in meters). The darkness of the points show the closeness to the floorplan (the darker the closer). The right bar shows the values of the distance from the points to floorplan (bright points are far from the plan, about 1.2 m, dark points are close to the plan).

A visualization of the metric in FIG. 8 illustrates this effect, refine graph 820 contains points that are more closer to floorplan (darker) than raw graph 810. Birds-eye view of this scan aligned to the floorplan is shown in FIG. 7. The walls in the two bottom scans are apparently closer to the floorplan than in the top ones.

TABLE 1

| | MME↓ | MPV↓ | MOM↓ | NSD↓ |
|---|---|---|---|---|
| Raw poses | −3.53 | 30.01 | 81.55 | 28.23 |
| BA | −3.61 | 25.51 | 65.19 | 28.17 |
| BA + F2P | −3.62 | 25.01 | 61.62 | 28.49 |
| BA + W2P | −3.61 | 25.13 | 61.84 | 25.14 |
| BA + F2P + W2P | −3.63 | 24.86 | 59.08 | 25.10 |

Table 1 features results on ablation studies on loss terms for SMapper dataset.

Here, BA corresponds to pure 3D bundle adjustment, F2P stands for floor-to-plane pulling, W2P stands for wall-to-plan pulling.

TABLE 2

| | MME↓ | MPV↓ | MOM↓ | NND↓ | NSD↓ |
|---|---|---|---|---|---|
| Raw poses | −3.81 | 18.68 | 33.07 | 9.43 | 8.37 |
| BA | −3.84 | 17.98 | 32.63 | 9.09 | 8.49 |
| BA + F2P | −3.99 | 14.72 | 29.23 | 8.48 | 8.97 |
| BA + W2P | −3.94 | 15.52 | 29.61 | 8.62 | 6.53 |
| BA + F2P + W2P | −4.02 | 14.46 | 28.94 | 8.38 | 6.31 |

Table 2 features Results on ablation studies on loss terms for Redwood dataset.

Here, BA corresponds to pure 3D bundle adjustment, F2P stands for floor-to-plane pulling, W2P stands for wall-to-plan pulling.

Fixed nearest wall $$L_W^W$$

was taken as a W2P term in these experiments. W However, all three approaches were compared to figure out how much they differ. According to Table 3 provided below, fixed nearest plane pulling has demonstrated significant advantages over two other methods on SMapper dataset. This was due to a lower quality of initial data in this dataset, since, being an online tracker, Google ARCore is more prone to errors and geometry gets more corrupted. Consequently, alignment of scan walls and floorplan wall planes based only on point distance may be wrong.

In this case, fixed plane strategy took more information into account and established a more stable alignment. Regarding the Redwood dataset (see Table 4 provided below), initialization of camera trajectory demonstrated to be quite accurate. Thus, the iterative plane strategy was sufficient for good convergence. The results of this approach were a bit better than the fixed plane ones, but the difference was not significant. In addition to the quality of the scan in its capacity as such, it was considered, how different wall pulling strategies affect the floorplan distance (see the last column in Tables 3 and 4). The nearest point approach expectedly showed the best performance, since it directly minimized the distance to the floorplan. Two other strategies aimed at more stable pulling and led to weaker corrections in exchange for a better reconstruction quality.

TABLE 3

| | MME↓ | MPV↓ | MOM↓ | NSD↓ |
|---|---|---|---|---|
| Nearest Point | −3.59 | 25.45 | 63.81 | 16.60 |
| Iterative Plane | −3.60 | 25.50 | 63.88 | 24.18 |
| Fixed Plane | −3.61 | 25.13 | 61.84 | 25.14 |

Table 3 features results on ablation studies on different wall-to-plan pulling strategies for SMapper dataset.

Although iterative plane and fixed plane approaches showed quite similar evaluation results, the latter one was selected since it showed a much faster performance. Table 5 below contains the measurements of average calculation time per million points for each term. It confirmed the theoretical conclusion that the nearest neighbor search contributed a lot into the length of cost function computation.

TABLE 4

| | MME↓ | MPV↓ | MOM↓ | NSD↓ |
|---|---|---|---|---|
| Nearest Point | −3.93 | 16.88 | 31.04 | 4.84 |
| Iterative Plane | −3.96 | 15.39 | 30.91 | 6.31 |
| Fixed Plane | −3.94 | 15.52 | 29.61 | 6.53 |

Table 4 features results on ablation studies on different wall-to-plan pulling strategies for Redwood dataset.

TABLE 5

| | $L_{RA}$ | $L_j$ | $L_W^{NP}$ | $L_W^{IW}$ | $L_W^{FW}$ |
|---|---|---|---|---|---|
| Time, ms | 15.09 | 6.97 | 66.52 | 70.47 | 6.90 |

Table 5 features calculation time of each of the cost function terms for million points.

Figure 10:
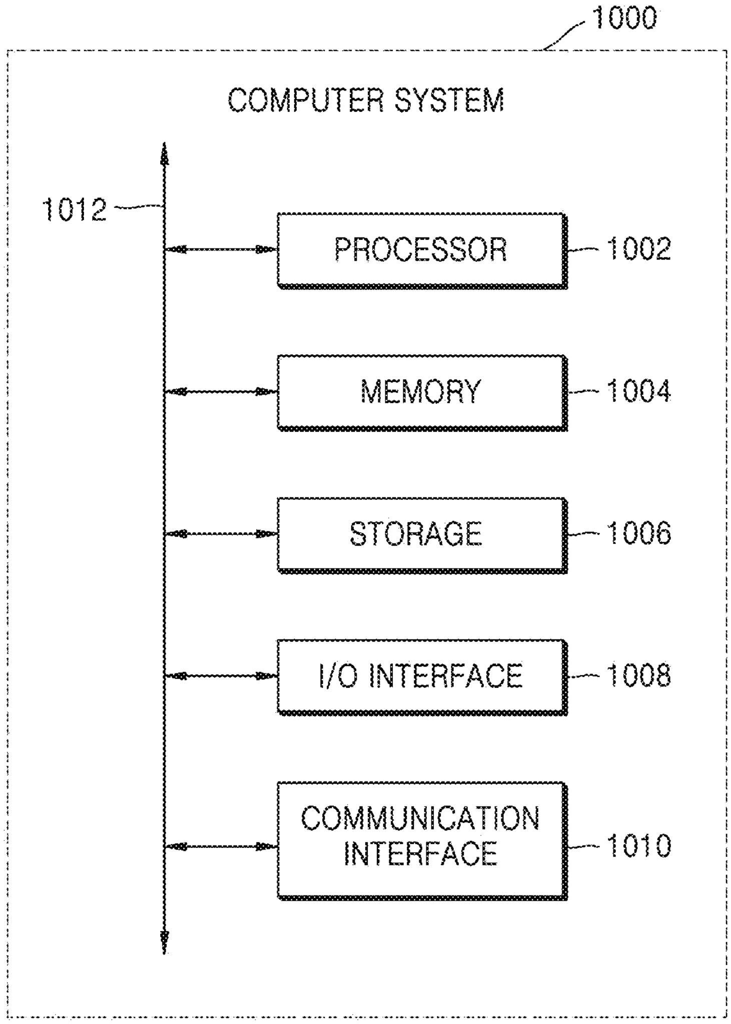
FIG. 10 illustrates an example computer system according to one or more embodiments of the disclosure.

FIG. 10 illustrates an example computer system may be utilized to perform floorplan-aware camera poses refinement in accordance with the presently disclosed embodiments. According to one or more embodiments of the present disclosure, one or more computer systems 1000 perform one or more operations of one or more methods described or illustrated herein. According to one or more embodiments of the present disclosure, one or more computer systems 1000 provide functionality described or illustrated herein. According to one or more embodiments of the present disclosure, software running on one or more computer systems 1000 performs one or more operations of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more operations of one or more methods described or illustrated herein. As an example, and not by way of limitation, one or more computer systems 1000 may perform in real time or in batch mode one or more operations of one or more methods described or illustrated herein. One or more computer systems 1000 may perform at different times or at different locations one or more operations of one or more methods described or illustrated herein, where appropriate.

According to one or more embodiments of the present disclosure, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. According to one or more embodiments of the present disclosure, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. According to one or more embodiments of the present disclosure, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. According to one or more embodiments of the present disclosure, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

According to one or more embodiments of the present disclosure, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. According to one or more embodiments of the present disclosure, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. According to one or more embodiments of the present disclosure, one or more memory management units (MMUs) reside between processor 1002 and memory 1004 and facilitate accesses to memory 1004 requested by processor 1002. According to one or more embodiments of the present disclosure, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

According to one or more embodiments of the present disclosure, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. According to one or more embodiments of the present disclosure, storage 1006 is non-volatile, solid-state memory. According to one or more embodiments of the present disclosure, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

According to one or more embodiments of the present disclosure, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

According to one or more embodiments of the present disclosure, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

According to one or more embodiments of the present disclosure, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA)

bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

A method and a system for floorplan-aware camera pose refinement were described above. They may be used to obtain precise camera pose (i.e. position and orientation) information by refining camera pose information for every given scan in a sequence of one or more RGB-D scans, as well as refining (estimating) camera trajectory in various 3D indoor scene scan generation scenarios.

Persons skilled in the art shall understand that the method may be implemented by various combinations of hardware and software means, and any such particular combinations do not restrict the scope of the present disclosure. The modules described above, which constitute the embodiments of the present disclosure, may be implemented in the form of separate hardware means, or two or more modules may be implemented by one hardware means, or the embodiments of the present disclosure may be implemented by one or more computer(s), processor(s) (CPUs) such as general purpose processors or specialized processors such as graphics processors (GPUs), or by one or more ASICs, FPGAs, logic elements etc. Alternatively, one or more modules may be implemented as software means such as e.g. a program or programs, computer program element(s) or module(s) which control one or more computer(s), CPUs etc. to implement the method operations and/or operations as described in detail above. These software means may be embodied in one or more computer-readable media which are well known to ones skilled in the art, may be stored in one or more memories such as a ROM, a RAM, flash memory, EEPROM, etc., or provided e.g. from remote servers via one or more wired and/or wireless network connections, the Internet, Ethernet connection, LAN(s), or other local or global computer networks, if necessary.

Persons skilled in the art shall understand that only some of the possible examples of techniques and material and technical means by which embodiments of the present disclosure may be implemented are described above and shown in the figures. Detailed description of embodiments of the present disclosure as provided above is not intended for limiting or defining the scope of legal protection of the present disclosure.

In an embodiment which may be encompassed by the scope of the present disclosure may be conceived by persons skilled in the art after careful reading of the above specification with reference to the accompanying drawings, and all such apparent modifications, changes and/or equivalent substitutions are considered to be included in the scope of the present disclosure. All related art references cited and discussed herein are hereby incorporated in this disclosure by reference where applicable.

While the present disclosure has been described and illustrated with reference to its different embodiments, persons skilled in the art shall understand that various modifications in its form and specific details may be made without departing from the scope of the present disclosure which is only defined by the claims provided hereinbelow and their equivalents.

What is claimed is:

1. A method performed by at least one processor for floorplan-aware camera pose refinement, the method comprising:

receiving a floorplan of a three-dimensional (3D) structure of a scene;

receiving one or more imaging scans of the scene;

identifying a gravity direction for the one or more imaging scans;

generating, based on the gravity direction, a boundary scan by filtering out one or more points in the one or more imaging scans having horizontal projections that deviate from other points in the one or more imaging scans by a predetermined amount;

aligning the boundary scan with the floorplan;

extracting one or more structural elements in the one or more imaging scans; and optimizing a three-term cost function comprising a geometric term, a floor term and, a walls term by correlating points in the one or more imaging scans corresponding to the one or more structural elements to respective points in the floorplan.

2. The method of claim 1, wherein the three-term cost function is formulated as:

$$L = L_{geom} + \lambda_{floor} L_{floor} + \lambda_{wallls} L_{walls},$$

wherein $L_{geom}$ is the geometric term, $L_{floor}$ is the floor term, and $L_{walls}$ is the walls term, and wherein $\lambda_{floor}$ and $\lambda_{walls}$ are weight coefficients configured to make contributions of all terms of the three-term cost function equal.

3. The method of claim 1, wherein the floorplan is a 3D floorplan obtained from a set of 3D points generated based on a vector image with one or more walls depicted as segments.

4. The method of claim 1, wherein the one or more imaging scans of the scene are one or more RGB-D scans comprising one or more RGB image frames, depth data, and camera pose information.

5. The method of claim 1, wherein the floorplan is represented by a set of planes approximating one or more walls within the scene, wherein the correlating the points in the one or more imaging scans to the respective points in the floorplan comprises:

correlating the points in the one or more imaging scans to nearest floorplan planes by (i) finding a nearest floorplan point for each point in the one or more imaging scans and (ii) estimating a distance of each nearest floorplan point to a corresponding wall plane; and obtaining the walls term $L_{walls}$ by averaging the estimated distances.

6. The method of claim 1, wherein the correlating the points in the one or more imaging scans to the respective points in the floorplan comprises:

clustering a plurality of the points in the one or more imaging scans based on a normal of the plurality of points into one or more clusters of points;

fitting one or more vertical wall planes for the one or more clusters of points by defining the one or more vertical wall planes such that a deviation of points in the one or more clusters from a given plane is minimized;

matching the one or more vertical wall planes with respective floorplan wall planes;

calculating a point-plane distance for each pair of a given point cluster and a respective vertical wall plane; and obtaining the walls term $L_{walls}$ by summing the point-plane distances.

7. The method of claim 1, wherein the aligning the boundary scan with the floorplan and the optimizing the three-term cost function are alternated in an iterative manner.

8. A system for floorplan-aware camera pose refinement, the system comprising:

a memory storing instructions; and at least one processor operatively coupled to the memory and configured to execute the one or more instructions stored in the memory, wherein the one or more instructions, when executed by the at least one processor, cause the system to:

receive a floorplan of three-dimensional (3D) structure of a scene which reflects the prior structure of the scene;

receive one or more imaging scans of the scene;

identify a gravity direction for the one or more imaging scans;

generate, based on the gravity detection, a boundary scan by filtering out one or more points in the one or more imaging scans having horizontal projections that deviate from other points in the one or more imaging scans by a predetermined amount;

align the boundary scan with the floorplan;

extract one or more structural elements in the one or more imaging scans; and optimize a three-term cost function comprising a geometric term, a floor term, and a walls term by correlating points in the one or more imaging scan corresponding to the one or more structural elements, to respective points in the floorplan.

9. The system of claim 8, wherein the three-term cost function is formulated as:

$$L = L_{geom} + \lambda_{floor} L_{floor} + \lambda_{wallls} L_{walls},$$

wherein $L_{geom}$ is the geometric term, $L_{floor}$ is the floor term, and $L_{walls}$ is the walls term, $\lambda_{floor}$ and/walls are weight coefficients configured to make contributions of all terms of the three-term cost function equal.

10. The system of claim 8, wherein the floorplan is a 3D floorplan obtained from a set of 3D points generated based on a vector image with one or more walls depicted as segments.

11. The system of any one of claim 8, wherein the one or more imaging scans of the scene are one or more RGB-D scans comprising one or more RGB image frames, depth data, and camera pose information.

12. The system of claim 8, wherein the floorplan is represented by a set of planes approximating one or more walls within the scene, wherein, to perform correlating the points in the one or more imaging scans to respective points in the floorplan, the at least one processor is configured to:

correlate the points to nearest floorplan planes by finding the nearest floorplan point for each point and estimating a distance to the corresponding wall plane; and obtain the walls term $L_{walls}$ by averaging the estimated distances.

13. The system of claim 8, wherein, to perform pulling points in the one or more imaging scans to respective points in the floorplan, the one or more instructions cause the system to:

cluster a plurality of the points in the one or more imaging scans based on a normal of the plurality of points into one or more clusters of points;

fit one or more vertical wall planes for the one or more clusters of points by defining one or more vertical wall planes such that a deviation of points in the one or more clusters from a given plane is minimized;

match the vertical wall planes with respective floorplan wall planes;

calculate a point-plane distance for each pair of a given point cluster and a respective vertical wall plane; and obtain the walls term $L_{walls}$ by summing the point-plane distances.

14. The system of claim 8, wherein the one or more instructions cause the system to alternate said aligning the boundary scan with the floorplan and said optimizing the three-term cost function in an iterative manner.

15. A non-transitory computer readable medium having instructions stored therein, which when executed by a processor cause the processor to execute a method comprising:

receiving a floorplan of a three-dimensional (3D) structure of a scene;

receiving one or more imaging scans of the scene;

identifying a gravity direction for the one or more imaging scans;

generating, based on the gravity direction, a boundary scan by filtering out one or more points in the one or more imaging scans having horizontal projections that deviate from other points in the one or more imaging scans by a predetermined amount;

aligning the boundary scan with the floorplan;

extracting one or more structural elements in the one or more imaging scans; and optimizing a three-term cost function comprising a geometric term, a floor term and, a walls term by correlating points in the one or more imaging scans corresponding to the one or more structural elements to respective points in the floorplan.

16. The non-transitory computer readable medium of claim 15, wherein the three-term cost function is formulated as:

$$L = L_{geom} + \lambda_{floor} L_{floor} + \lambda_{wallls} L_{walls},$$

wherein $L_{geom}$ is the geometric term, $L_{floor}$ is the floor term, and $L_{walls}$ is the walls term, and wherein $\lambda_{floor}$ and $\lambda_{walls}$ are weight coefficients configured to make contributions of all terms of the three-term cost function equal.

17. The non-transitory computer readable medium of claim 15, wherein the floorplan is a 3D floorplan obtained from a set of 3D points generated based on a vector image with one or more walls depicted as segments.

18. The non-transitory computer readable medium of claim 15, wherein the one or more imaging scans of the scene are one or more RGB-D scans comprising one or more RGB image frames, depth data, and camera pose information.

19. The non-transitory computer readable medium of claim 15, wherein the floorplan is represented by a set of planes approximating one or more walls within the scene, wherein the correlating the points in the one or more imaging scans to the respective points in the floorplan comprises:

correlating the points in the one or more imaging scans to nearest floorplan planes by (i) finding a nearest floorplan point for each point in the one or more imaging scans and (ii) estimating a distance of each nearest floorplan point to a corresponding wall plane; and obtaining the walls term $L_{walls}$ by averaging the estimated distances.

20. The non-transitory computer readable medium 15, wherein the correlating the points in the one or more imaging scans to the respective points in the floorplan comprises:

clustering a plurality of the points in the one or more imaging scans based on a normal of the plurality of points into one or more clusters of points;

fitting one or more vertical wall planes for the one or more clusters of points by defining the one or more vertical wall planes such that a deviation of points in the one or more clusters from a given plane is minimized;

matching the one or more vertical wall planes with respective floorplan wall planes;

calculating a point-plane distance for each pair of a given point cluster and a respective vertical wall plane; and obtaining the walls term $L_{walls}$ by summing the point-plane distances.

* * * * *